United States Patent
Raszuk et al.

(10) Patent No.: US 7,535,828 B2
(45) Date of Patent: May 19, 2009

(54) ALGORITHM FOR BACKUP PE SELECTION

(75) Inventors: Robert Raszuk, Komorow (PL);
Jean-Philippe Vasseur, Dunstable, MA (US); Clarence Filsfils, Brussels (BE); Jim Guichard, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 11/084,838

(22) Filed: Mar. 18, 2005

(65) Prior Publication Data
US 2006/0209682 A1 Sep. 21, 2006

(51) Int. Cl.
*G01R 31/08* (2006.01)
*H04L 12/28* (2006.01)

(52) U.S. Cl. .................. 370/219; 370/392; 370/401

(58) Field of Classification Search .............. 370/216, 370/217, 218, 219, 220, 221, 222, 223, 224, 370/225, 226, 227, 228, 395.2, 395.21, 395.41, 370/395.42, 395.43
See application file for complete search history.

(56) References Cited

U.S. PATENT DOCUMENTS

| | | | |
|---|---|---|---|
| 6,339,595 B1 | 1/2002 | Rekhter et al. | |
| 6,665,273 B1 | 12/2003 | Goguen et al. | |
| 6,778,492 B2 | 8/2004 | Charny et al. | |
| 7,345,991 B1 * | 3/2008 | Shabtay et al. | 370/221 |
| 2002/0060985 A1 | 5/2002 | Lee et al. | |
| 2002/0112072 A1 * | 8/2002 | Jain | 709/239 |
| 2003/0028818 A1 | 2/2003 | Fujita | |
| 2003/0233595 A1 | 12/2003 | Charny et al. | |
| 2004/0052207 A1 * | 3/2004 | Charny et al. | 370/216 |
| 2004/0076160 A1 * | 4/2004 | Phaltankar | 370/395.1 |
| 2004/0109687 A1 | 6/2004 | Park et al. | |
| 2004/0196827 A1 * | 10/2004 | Xu et al. | 370/352 |
| 2005/0160171 A1 * | 7/2005 | Rabie et al. | 709/227 |

OTHER PUBLICATIONS

Andrew S. Tenenbaum, "Computer Networks", Fourth Edition, Section 1.4.2 pp. 41-44, Pearson Education 2003.
Radia Perlman, "Interconnections Second Edition: Bridges, Routers, Switches and Internetworking Protocols", Chapter 9 pp. 189-220, Addison Wesley Longman, Inc. 2000.

(Continued)

*Primary Examiner*—Seema S Rao
*Assistant Examiner*—Christine Duong
(74) *Attorney, Agent, or Firm*—Cesari and McKenna, LLP

(57) ABSTRACT

A fast reroute (FRR) technique is implemented at the edge of a computer network. If an edge device detects a node or link failure that prevents it from communicating with a neighboring routing domain, the edge device reroutes at least some data packets addressed to that domain to a backup edge device which, in turn, forwards the packets to the neighboring domain. The backup edge device is not permitted to reroute the packets a second time. According to the inventive technique, the edge device first identifies a group one or more possible backup edge devices and then selects at least one preferred backup edge device from the group. The edge device makes its selection based on the values of one or more metrics associated with the possible backup edge devices. The metrics are input to a novel selection algorithm that selects the preferred backup edge device(s) using a hierarchical selection process or a weighted-metric selection process, or some combination thereof.

33 Claims, 14 Drawing Sheets

OTHER PUBLICATIONS

Radia Perlman, "Interconnections Second Edition: Bridges, Routers, Switches, and Internetworking Protocols", Sections 12.1-12.3 pp. 299-324, Addison Wesley longman, Inc. 2000.

Stephen A. Thomas, "IP Switching and Routing Essentials", Chapter 7 pp. 221-243, 2002.

Ivan Pepelnjak and Jim Guichard, "MPLS and VPN Architectures", Chapters 8-9 pp. 145-205, Cisco Press 2001.

E. Rosen and Y. Rekhter, "BGP/MPLS VPNs", Request for Comments 2547, Mar. 1999.

Y. Rekhter and T. Li, "A Border Gateway Protocol 4 (BGP-4)", Request for Comments 1771, Mar. 1995.

Clarence Filsfils et al., "Fast Reroute (FRR) Protection At the Edge of a RFC 2547 Network", U.S. Appl. No. 11/010,225, filed on Dec. 10, 2004.

Clarence Filsfils et al., "Loop Prevention Technique for MPLS Using Two Labels" U.S. Appl. No. 11/046,163, filed Jan. 26, 2005.

Clarence Filsfils et al., "Loop Prevention Technique For MPLS Using Service Labels" U.S. Appl. No. 11/068,081, filed Feb. 28, 2005.

A. Lindem et al., "Extensions to OSPF for Advertising Optional Router Capabilities", Internet Draft draft-ietf-ospf-cap-06.txt available at http://www.ietf.org, Feb. 7, 2005.

K. Kompella et al., "IS-IS Extensions in Support of Generalized Multi-Protocol Label Switching", Internet Draft draft-ietf-isis-gmpls-extensions-19.txt available at http://www.ietf.org, Oct. 8, 2003.

Jean-Philippe Vasseur et al., "IS-IS Extensions for Advertising Router Information", Internet Draft draft-ietf-isis-caps-00.txt available at http://www.ietf.org, Jan. 2005.

R. Srihari et al., "BGP Extended Communities Attribute", Internet Draft draft-ietf-idr-bgp-ext-communities-08.txt available at http://www.ietf.org, Expires Aug. 2005.

K. Kompella et al., "OSPF Extensions in Support of Generalized Multi-Protocol Label Switching", Internet Draft draft-ietf-ccamp-ospf-gmpls-extensions-12.txt available at http://www.ietf.org, Oct. 2003.

K. Kompella et al., "Routing Extensions in Support of Generalized Multi-Protocol Label Switching", Internet Draft draft-ietf-ccamp-gmpls-routing-09.txt available at http://www.ietf.org, Oct. 2003.

PCT Notification of Transmittal of the International Search Report and the Written Opinion of the International Searching Authority, or the Declaration, International Application No. PCT/US06/09073, International Filing Date Mar. 14, 2006, Date of Mailing Aug. 10, 2007, 9 pages.

\* cited by examiner

| ADDRESS PREFIX 520 | VPN LABEL VALUE 530 | VRF IDENTIFIER 540 | FRR ENABLE FLAG 550 | FRR EXCLUDE FLAG 560 | BACKUP PE DEVICE 570 | BACKUP LABEL STACK (IGP LABEL, VPN LABEL) 580 |
|---|---|---|---|---|---|---|
| 10.1.2.0/24 | 57 | 1 | 1 | 0 | PE3 | 100, 75 |
| ... | ... | ... | ... | ... | ... | ... |

LABEL FORWARDING TABLE 500

FIG. 5

TABLE 600

| PREFIX 610 | (POSSIBLE BACKUP PE DEVICE 622, SET OF METRICS 624) 620 |
|---|---|
| ⋮ | ⋮ |
| 10.1.2.0/24 | (PE2, M1, M2 ... MN), (PE3, M1, M2 ... MN) |
| ⋮ | ⋮ |

ALGORITHM FOR BACKUP PE SELECTION

RELATED APPLICATIONS

This application is related to U.S. patent application Ser. No. 11/010,225, entitled FAST REROUTE (FUR) PROTECTION AT THE EDGE OF A RFC 2547 NETWORK, filed Dec. 10, 2004, by Clarence Filsfils et al., the teachings of which are expressly incorporated herein by reference.

This application is related to U.S. patent application Ser. No. 11/046,163, entitled LOOP PREVENTION TECHNIQUE FOR MPLS USING TWO LABELS, filed Jan. 26, 2005, by Clarence Filsfils et al., the teachings of which are expressly incorporated herein by reference.

This application is related to U.S. patent application Ser. No. 11/068,081, entitled LOOP PREVENTION TECHNIQUE FOR MPLS USING SERVICE LABELS, filed Feb. 28, 2005, by Clarence Filsfils et al., the teachings of which are expressly incorporated herein by reference.

FIELD OF THE INVENTION

This invention relates generally to routing data between private routing domains, and, more specifically, to a fast reroute (FRR) technique that quickly and efficiently reroutes network traffic to a neighboring exit point in the event of a node or link failure.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are used to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1/24. In this case, the network portion of the prefix contains the 24 most-significant bits of the IP address 128.0.10.1, i.e., the network is 128.0.10.0, and the last 8 bits are used to identify hosts on that network. An IP address and an address prefix are said to "match" when the prefix's network portion equals the IP address's most-significant bits.

Interior Gateway Protocols

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information is exchanged and processed in the routing domain. For instance, IGP protocols typically provide a mechanism for distributing a set of reachable IP subnetworks among the intermediate nodes in the routing domain. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4* (BGP-4), by Y. Rekhter et al., published March 1995, which is publicly available through the Internet Engineering Task Force (IETF) and is hereby incorporated by reference in its entirety. External BGP (eBGP) is often used to exchange routing information across routing domain boundaries. Internal BGP (iBGP) is a variation of the eBGP protocol and is often used to distribute inter-network reachability information (address prefixes) among BGP-enabled edge devices situated within the same routing domain. To implement iBGP, the edge devices must be "fully meshed," i.e., such that every device is coupled to every other device by way of a TCP connection. In practice, conventional route reflectors are used to logically couple devices into a full mesh. The BGP protocol also may be extended for compatibility with services other than standard Internet connectivity. For instance, Multi-Protocol BGP (MP-BGP) supports various address family identifier (AFI) fields that permit BGP messages to transport multi-protocol information, such as is the case with RFC 2547 services.

A network node in a routing domain may detect a change in the domain's topology. For example, the node may become unable to communicate with one of its neighboring nodes, e.g., due to a link failure between the nodes or the neighboring node failing, such as going "off line" for repairs. If the detected node or link failure occurred within the routing domain, the detecting node may advertise the intra-domain topology change to other nodes in the domain using an interior gateway protocol, such as OSPF. Similarly, if an edge device detects a node or link failure that prevents communications with a neighboring routing domain, the edge device may disseminate the inter-domain topology change to its other fully-meshed edge devices, e.g., using the iBGP protocol. In either case, there is an inherent latency of propagating the network-topology change within the routing domain and having nodes in the domain converge on a consistent view of the new network topology, i.e., without the failed node or link.

Shared Risk Link Groups

The concept of shared risk link groups (SRLG) has been introduced to reflect that failure of a single network element, such as a network node or data link, can result in failures at one or more other network elements. For instance, when different data links share a common resource, such as an optical fiber or the like, they are said to participate in the same link-SRLG. That is, failure of the shared resource (the fiber in this example) would result in the failures of each of the links whose data packets are transported using that shared resource. Similarly, when multiple edge devices in a first routing domain are attached to a common edge device in a second routing domain, the set of edge devices in the first domain may be members of the same node-SRLG. In this case, a network failure at the common edge device would prevent each device in the node-SRLG from communicating data over its respective inter-domain link coupled to the failed edge device in the second domain.

Node and/or link SRLG membership information may be communicated among a set of fully-meshed edge devices using standardized extensions to conventional interior gateway protocols, such the OSPF and Intermediate-System-to-Intermediate-System (IS-IS) protocols. Typically, a SRLG is identified by a 32-bit number that is unique within an IGP domain, as described in more detail in section 2.3 of the IETF Internet Draft draft-ietf-ccamp-gmpls-routing-09.txt, entitled *Routing Extensions in Support of Generalized Multi-Protocol Label Switching*, by Kompella et al., dated October 2003, which is hereby incorporated by reference as though fully set forth herein.

In practice, a link or node may be statically assigned, e.g., by a network administrator, to one or more SRLGs. The link or node is then associated with a different 32-bit identifier for each of its assigned SRLGs. These SRLG identifiers are typically stored along with an identifier of the link or node in a type-length-value (TLV) tuple. The TLV is advertised within a routing domain to disseminate the link or node's SRLG information. For instance, SRLG TLVs for OSPF and IS-IS advertisements are respectively described in the IETF Internet Drafts draft-ietf-ccamp-ospf-gmpls-extensions-12.txt, entitled *OSPF Extensions in Support of Generalized Multi-Protocol Label Switching*, dated October 2003, by Kompella et al. and draft-ietf-isis-gmpls-extensions-19.txt, entitled *IS-IS Extensions in Support of Generalized Multi-Protocol Label Switching*, dated October 2003, by Kompella et al., both of which are hereby incorporated by reference as though fully set forth herein.

Multi-Protocol Label Switching/Virtual Private Network Architecture

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, between a pair of source and destination nodes; the set of network nodes situated along the LSP may be determined using reachability information provided by conventional interior gateway protocols, such as OSPF or IS-IS. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination. MPLS traffic engineering provides additional advantages over IP-based routing, such as enabling MPLS-configured nodes to reserve network resources, such as bandwidth, to ensure a desired quality of service (QoS).

Each destination represented via a LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or MP-BGP protocol. Operationally, when a data packet is received at a MPLS-configured node, the node extracts the packet's transported label value, e.g., stored at a known location in the packet's encapsulating headers. The extracted label value is used to identify the next network node to forward the packet. Typically, an IGP label determines the packet's next hop within a routing domain, and a VPN label determines the packet's next hop across routing domains. More generally, the IGP label may be a MPLS label or any other encapsulation header used to identify the packet's next hop in the routing domain.

The packet may contain a "stack" of labels such that the stack's top-most label determines the packet's next-hop destination. After receiving the packet, the MPLS-configured node "pops" (removes) the packet's top-most label from the label stack and performs a label-lookup operation to determine the packet's next-hop destination. Then, the node "pushes" (inserts) a new label value associated with the packet's next hop onto the top of the stack and forwards the packet to its next destination. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site may be multi-homed to the provider network, i.e., wherein one or more of the customer's CE devices is coupled to a plurality of PE devices. The PE and CE devices are generally intermediate network nodes, such as routers or switches, located at the edge of their respective networks. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, IS-IS, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

FIG. 1 illustrates an exemplary MPLS/VPN network 100 containing a provider network 110 coupled to neighboring customer sites 120, 130 and 140. The provider network includes a plurality of PE devices 300, including devices PE1 300a, PE2 300b, PE3 300c and PE4 300d. The PE devices are fully meshed at the BGP level. That is, each PE device in the provider network can communicate with every other PE device (either directly or by means of BGP route reflectors). The network 110 also contains "core" provider (P) devices 195a-d, such as routers, which are respectively labeled P1, P2, P3 and P4. These P devices may be used to establish label switched paths between pairs of PE devices. For example, the provider devices P1 and P2 may be used to establish a first LSP1 between PE4 and PE1, and the devices P3 and P4 may be used to establish a second LSP2 between PE4 and PE3.

Each neighboring customer site 120-140 contains one or more CE devices attached to PE devices in the provider network 110. For instance, the customer site 120 contains CE devices 160 and 165 (labeled CE1 and CE2) which are coupled to PE1, PE2 and PE3. Similarly, the customer site 130 includes a CE device 135 (labeled CE4) attached to PE3 and the customer site 140 includes a CE device 185 (labeled CE3) attached to PE4. The customer sites 120-140 are assigned to respective VPNs. For purposes of illustration, the customer sites 120 and 140 are assigned to the VPN1 and the customer site 130 is assigned to the VPN2. In this arrangement, network nodes in the customer sites 120 and 140 (VPN1) may not establish communications with nodes in the customer site 130 (VPN2) and vice versa since they participate in different VPNs. However, network nodes in the customer site 120 may communicate with nodes in the customer site 140, and vice versa, since the customer sites 120 and 140 both participate in VPN1. Notably, VPN1 and VPN2 may contain overlapping IP address spaces.

As noted, communications may be established through the MPLS/VPN network 100 between remote customer sites participating in the same VPN, e.g., VPN1. The provider network 110 may create a MPLS tunnel, such as LSP1 or LSP2, to provide a logical data path between the remote customer sites of VPN1. Suppose a source node (S) 150 in the customer site 140 addresses a data packet 105 to a destination node (D) 155 in the customer site 120. The source node forwards the packet to its local customer edge device CE3, which in turn transfers the packet across domain boundaries to the provider edge device PE4. PE4 then determines an appropriate LSP over which to forward the packet through the provider network 110 to the customer site 120 containing the packet's addressed destination node 155.

The provider edge device PE4 may associate the received packet 105 with a LSP based on the packet's contained destination IP address. For purposes of discussion, assume the packet 105 is routed from PE4 to PE1 via LSP1, as shown in bold. The packet is received by the provider edge device PE1 at the tail-end of the LSP1 and the packet is then forwarded over the PE1-CE1 link to CE1 in the customer site 120. CE1 receives the packet and forwards it to the destination node 155.

Problems arise in the conventional MPLS/VPN architecture when a node or link failure prevents data communications over a PE-CE data link. For example, suppose that the PE1-CE1 link fails as denoted by a dotted "X." After identifying the failure, the provider edge device PE1 may advertise, within the provider network 110, that it has lost reachability to the IP addresses previously advertised by CE devices in the customer site 120. Accordingly, PE1 may propagate the identified routing change by disseminating iBGP update messages to its fully-meshed PE devices. Eventually, the routing change is distributed throughout the provider network 110 and each PE device updates its local routing information to converge on the new network topology, i.e., without the failed PE1-CE1 link.

The conventional latency required for the PE devices to converge on the new network topology, i.e., without the PE1-CE1 link, is often overly time consuming, e.g., on the order of seconds, and causes a number of significant problems. For instance, data packets are often "dropped" (i.e., discarded) at the edge of the provider network while the network is in the process of converging. For example, in response to the PE1-CE1 link failing, data packets 105 addressed to the destination node 155 will be dropped by PE1 (at the tail-end of LSP1) until the network converges on an alternate data path LSP2 for those packets. For many data flows, such as voice-over-IP (VoIP) and video data flows, this temporary loss of data at PE1 may significantly degrade the utility of the overall data transfer or may cause the data flow to time-out and stop completely.

It is therefore generally desirable for MPLS/VPN networks to achieve faster convergence times, e.g., sub-second convergence times, in response to CE node or link failures over PE-CE links. The MPLS/VPN networks should quickly converge on the new network topology with minimal data loss at the edge of the network.

SUMMARY OF THE INVENTION

The present invention overcomes the disadvantages of the prior art by providing a fast reroute (FRR) technique that may be implemented at the edge of a computer network. If an edge device detects a node or link failure that prevents it from communicating with a neighboring routing domain, the edge device reroutes at least some data packets addressed to that domain to a backup edge device which, in turn, forwards the packets to the neighboring domain. The backup edge device is not permitted to reroute the packets a second time, e.g., in response to another inter-domain node or link failure. According to the inventive technique, the edge device first identifies a group of one or more possible backup edge devices and then selects at least one preferred backup edge device from the group. To that end, the edge device makes its selection based on the values of one or more metrics associated with the possible backup edge devices. The metrics may be evaluated based on, inter alia, the devices' associated IGP cost values, link and/or node shared risk link group (SRLG) memberships, link-bandwidth characteristics and so forth. The metrics are input to a novel selection algorithm that selects the preferred backup edge device(s) using a hierarchical selection process or a weighted-metric selection process, or some combination thereof.

The edge device preferably identifies possible backup edge devices on a per-address prefix basis. The edge device dynamically "learns" a possible backup edge device for a particular address prefix when the edge device receives the prefix from a device in a neighboring routing domain as well as from another edge device in the computer network. As such, the other edge device is identified as a possible backup edge device for the prefix. Alternatively, the edge device may be statically configured, e.g., by a system administrator, to associate the possible backup edge device with the particular address prefix.

After identifying an address prefix's group of possible backup edge devices, the edge device preferably performs a backup-path validation procedure that (i) determines whether the prefix is reachable and (ii) eliminates possible backup edge devices that are not capable of acting as backup devices. First, the edge device determines whether the prefix's next hop is reachable via an interior route (iBGP, IGP) or from a locally-connected device in a neighboring routing domain. If the prefix is determined to be unreachable, then the prefix is ineligible for FRR protection and thus may not be associated with any of its identified possible backup edge devices. Next, the edge device removes any of the prefix's possible backup edge devices that is not capable of functioning as a backup edge device. An edge device may advertise its backup capability (or non-capability) using BGP or IGP messages or its backup capability may be set by local policy (e.g., access control lists).

In accordance with a first illustrative embodiment, a hierarchy of selection criteria is used to select one or more preferred backup edge devices. In this embodiment, each backup-edge-device metric is assigned a relative preference level. Then, a first selection criterion evaluates the most-preferred metric (i.e., the metric having the greatest relative preference level) for each of the possible backup edge devices. The device having the greatest (or least) value of this metric is selected as the preferred backup edge device. If multiple possible backup edge devices satisfy the first criterion, then a second selection criterion may further reduce the set of possible backup edge devices. Preferably, the second criterion compares values of the next most-preferred metric. Similarly, a third criterion compares values of the third most-preferred metric, and so on. This hierarchical selection process is repeated until a desired number of backup edge devices is selected for a given address prefix.

If, at any stage of the hierarchical selection process, multiple possible backup edge devices satisfy the selection criteria, the process may be terminated. In this case, a preferred backup edge device may be randomly selected from the possible backup edge devices that satisfied the selection criteria at the time that the hierarchical selection process was terminated. Alternatively, network traffic may be load balanced (proportionally or otherwise) across the possible backup edge devices satisfying the selection criteria.

In a second illustrative embodiment, a mathematical function is used to select at least one preferred backup edge device. The mathematical function is preferably an objective polynomial function that calculates a weighted combination of the metrics associated with a possible backup edge device; this weighted combination of metrics may be interpreted as an "overall" metric for the device. In operation, the set of metric values for each possible backup edge device is input to the polynomial function. The overall metrics calculated for the devices are compared and the possible backup edge device having the greatest (or least) overall metric value is selected as the preferred backup edge device. In the event that multiple possible backup edge devices are selected based on the output of the polynomial function, the network administrator may randomly select at least one of the selected devices or may choose a metric as a tie-breaker among the devices. Alternatively, the network traffic instead may be load balanced (proportionally or otherwise) across the selected backup edge devices.

Advantageously, the inventive technique may utilize various types of metrics, without limitation, to characterize possible backup edge devices. Moreover, an edge device in the computer network may use a locally-deployed backup-edge-device selection algorithm, which may or may not be consistent with the selection algorithms deployed at other edge devices. For example, a first edge device may select backup edge devices using the illustrative hierarchical selection process, whereas a second edge device in the same network may select backup edge devices using the illustrative weighted-metric selection process.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an illustrative label forwarding table configured to store FRR-related information;

FIG. 6 is a schematic block diagram of an illustrative table configured to map address prefixes with their corresponding groups of identified possible backup PE devices and backup-device metrics;

DETAILED DESCRIPTION OF ILLUSTRATIVE EMBODIMENTS

MPLS/VPN FRR Network

In accordance with the illustrative embodiments, if an edge device detects a node or link failure that prevents it from communicating with devices in a neighboring domain, the edge device reroutes at least some data packets addressed to the neighboring domain to a backup edge device. The rerouted packets are preferably "tunneled" to the backup edge device, e.g., using an IP or MPLS tunneling mechanism. After receiving the rerouted packets, the backup edge device forwards the packets to the neighboring domain. Notably, the backup edge device is not permitted to reroute the received packets a second time, e.g., upon identifying another inter-domain node or link failure. As such, packet loops are avoided at the edge of the network.

Figure 1:
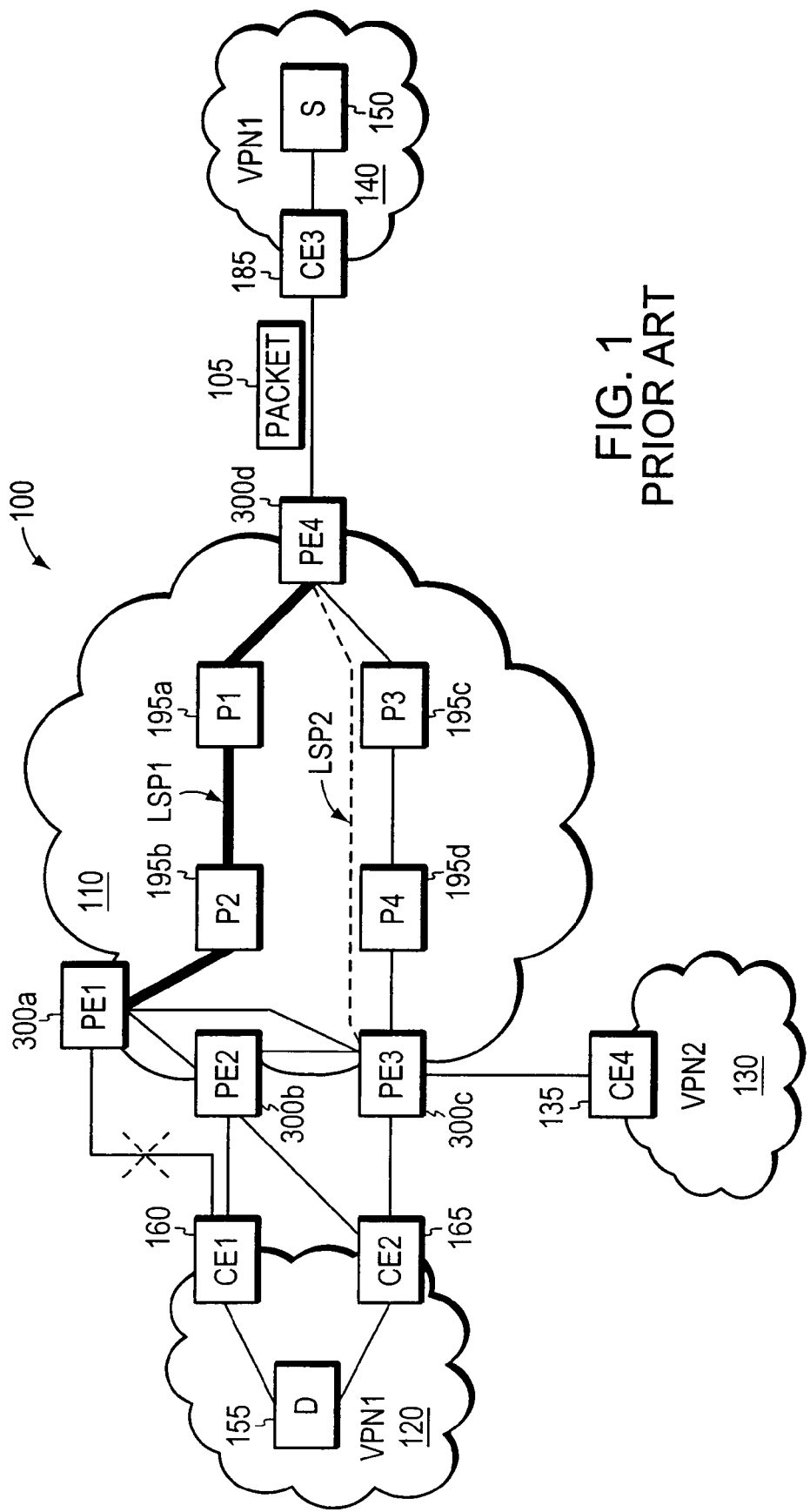
FIG. 1, previously described, is a schematic block diagram of a MPLS/VPN network topology.
Figure 2:
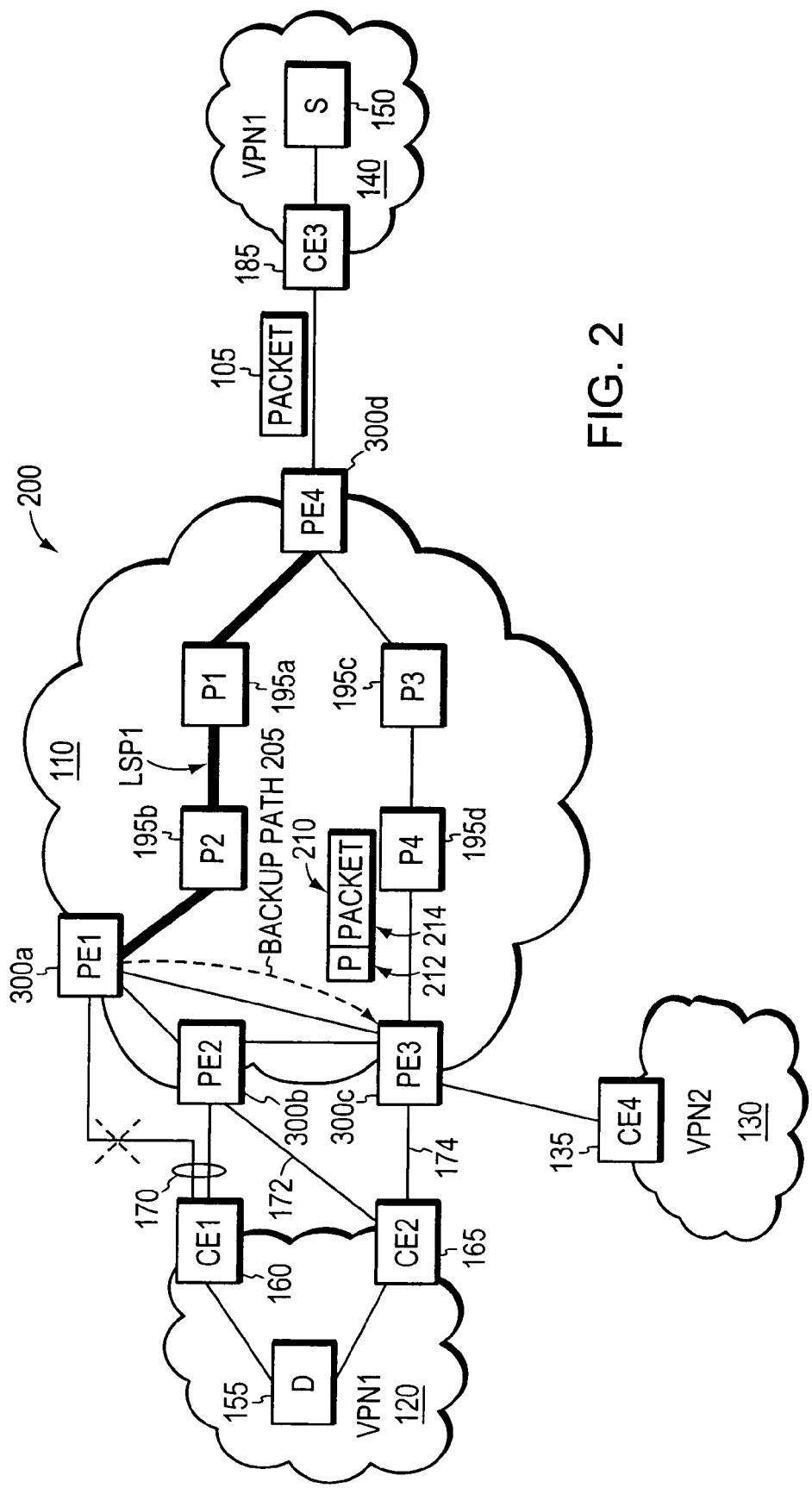
FIG. 2 is a schematic block diagram of an exemplary MPLS/VPN network topology in which the illustrative fast reroute (FRR) technique may be employed at the edge of the network. Those skilled in the art will appreciate that the network topology of FIG. 2 is merely representative and that the inventive FRR technique may be employed in other network topologies as well.

FIG. 2 illustrates a computer network 200 employing an illustrative embodiment of the invention. For ease of explanation, the network topology of network 200 is the same as that shown in FIG. 1. However, unlike in the network 100, the provider edge device PE1 does not "drop" packets upon losing communication with its neighboring customer site 120, e.g., due to a CE1 node failure or PE1-CE1 link failure. Instead, PE1 establishes a fast reroute (FRR) backup path 205 which is used to reroute at least some packets 210 to a backup provider edge device which is also coupled to the customer site 120. In this example, PE1 selects PE3 as a backup PE device and thus the backup path 205 is used to reroute packets from PE1 to PE3 to CE2. Packets 210 transported over the FRR backup path 205 may be encapsulated with at least one IP tunnel header or MPLS label stack associated with the backup path.

The provider edge device PE1 employs a backup-PE-device selection algorithm that selects at least one preferred backup PE device from a set of one or more possible backup PE devices. For instance, as shown, PE1 is connected to the possible backup PE devices PE2 and PE3, both of which are also coupled to the customer site 120. Further to the illustrative embodiment, PE1 makes its selection based on the values of one or more metrics associated with the possible backup edge devices PE2 and PE3. The metrics are input to a novel selection algorithm that selects the preferred backup edge device PE3 using a hierarchical selection process or a weighted-metric selection process, or some combination thereof.

Various types of metrics may be used to characterize possible backup edge devices, such as the provider edge devices PE2 and PE3. The metrics may be derived, measured or otherwise determined based on, inter alia, the devices' associated IGP cost values, link and/or node shared risk link group (SRLG) memberships, link-bandwidth characteristics and so forth. By way of example, some representative metrics are discussed below. For purposes of description, the representative metrics are selected such that larger metric values correspond to more preferred backup-device characteristics. However, those skilled in the art will understand that, in alternative embodiments, backup-device preference may be inversely proportional to the metric values.

First, consider a metric M1 whose value corresponds to the relative IGP cost required to reach a possible backup PE device. The metric M1 for a possible backup PE device may be defined, for example, as a constant value K divided by the IGP shortest path cost required to reach the device. Accordingly, PE1 may derive different metric M1 values for PE2 and PE3 since the data links PE1-PE2 and PE1-PE3 may be associated with different IGP cost values. For example, if K equals 100 and the IGP cost values associated with the links PE1-PE2 and PE1-PE3 respectively equal 50 and 20, then PE1 can determine that M1(PE2) equals 2, whereas M1(PE3) equals 5. In this case, the possible backup device PE3 would be the preferred backup PE device based on the value of the metric M1, since M1(PE3) is greater than the value of M1(PE2).

A second metric M2 may be derived based on the link-bandwidth characteristics of a possible backup device. For instance, the metric M2 may be used to reflect the relative bandwidths available over the inter-domain links, e.g., PE2-CE1, PE2-CE2, and PE3-CE2. Illustratively, the value of the metric M2 for an inter-domain data link may equal the link's bandwidth capacity in Megabits per second (Mbps). When a possible backup edge device, such as PE2, is associated with multiple inter-domain data links, the value of metric M2 for that device may be the largest (or average) inter-domain link bandwidth capacity at the device. Of course, the metric M2 may be normalized or derived in other functionally equivalent ways as will be understood by those skilled in the art. Preferably, the fully-meshed provider edge devices PE1-PE4 exchange their inter-domain link bandwidths in BGP extended community attributes included in iBGP update messages. Such a link-bandwidth extended community attribute is generally described in more detail in Section 6 of the IETF Internet Draft draft-ietf-idr-bgp-ext-communities-08.txt, entitled *BGP Extended Communities Attribute*, dated February 2005, by Sangli et al., which is hereby incorporated by reference as though fully set forth herein.

Yet other metrics may indicate whether a possible backup PE device participates in at least one disjoint node and/or link SRLG. As shown in FIG. 2, the PE1-CE1 and PE2-CE1 data links share a common transport medium, e.g., optical fiber 170, and thus participate in the same link-SRLG. Thus, if the fiber 170 fails or otherwise becomes unavailable, then both the data links PE1-CE1 and PE2-CE1 also become unavailable. In contrast, the PE-CE data links 172 and 174 are members of different link-SRLGs that do not transport data over the shared fiber 170. The provider edge devices PE2 and PE3 are members of a first node-SRLG, since they are both coupled to CE2. As such, the failure of CE2 would result in data communication failures over the PE-CE data links 172 and 174. Likewise, the provider edge devices PE1 and PE2 are both coupled to CE1 and therefore participate in a second node-SRLG that is disjoint from the first node-SRLG.

Preferably, a possible backup edge device's node-SRLG and link-SRLG memberships are associated with different metrics M3 and M4. For instance, where PE2 and PE3 are possible backup edge devices for the provider edge device PE1, PE1 may associate both the node-SRLG metric M3 and the link-SRLG metric M4 with each of the devices PE2 and PE3. The metric M3 may be a Boolean value (e.g., 0 or 1) that indicates whether or not a possible backup edge device is a member of at least one node-SRLG in which PE1 is not a member. Similarly, the metric M4 may be a Boolean value that indicates whether or not a possible backup edge device contains at least one data link that is a member of a link-SRLG in which PE1's data links are not members. In other embodiments, rather than being Boolean indicators, the values of the metrics M3 and/or M4 instead may be integer values that equal the number of disjoint SRLGs at a possible backup edge device.

For purposes of illustration and description, assume that PE1 inputs the metrics M1 through M4 to an appropriate backup-edge-device selection algorithm which, in turn, selects PE3 as the preferred backup edge device. Prior to forwarding the rerouted packets to the backup edge device PE3, the provider edge device PE1 designates the rerouted packets as being "protected." Here, a packet's protected status indicates that the packet is being rerouted in response to an inter-domain node or link failure. The packet's protected status may be transported concurrently with the rerouted packet 210 or may be separately sent to the provider edge device PE3, e.g., using an appropriate "out of band" signaling mechanism or protocol. For purposes of illustration, the rerouted packet 210 is shown as the concatenation of its protected status ("P") 212 and packet data ("packet") 214. The provider edge device PE3, after receiving the protected packet 210, is not permitted to reroute the packet 210 a second time in the event that it too loses communication with the customer site 120, e.g., due to a CE2 node failure or a PE3-CE2 link failure. Thus, the rerouted packets 210 cannot be circulated within loops created at the edge of the provider network 110.

Figure 3:
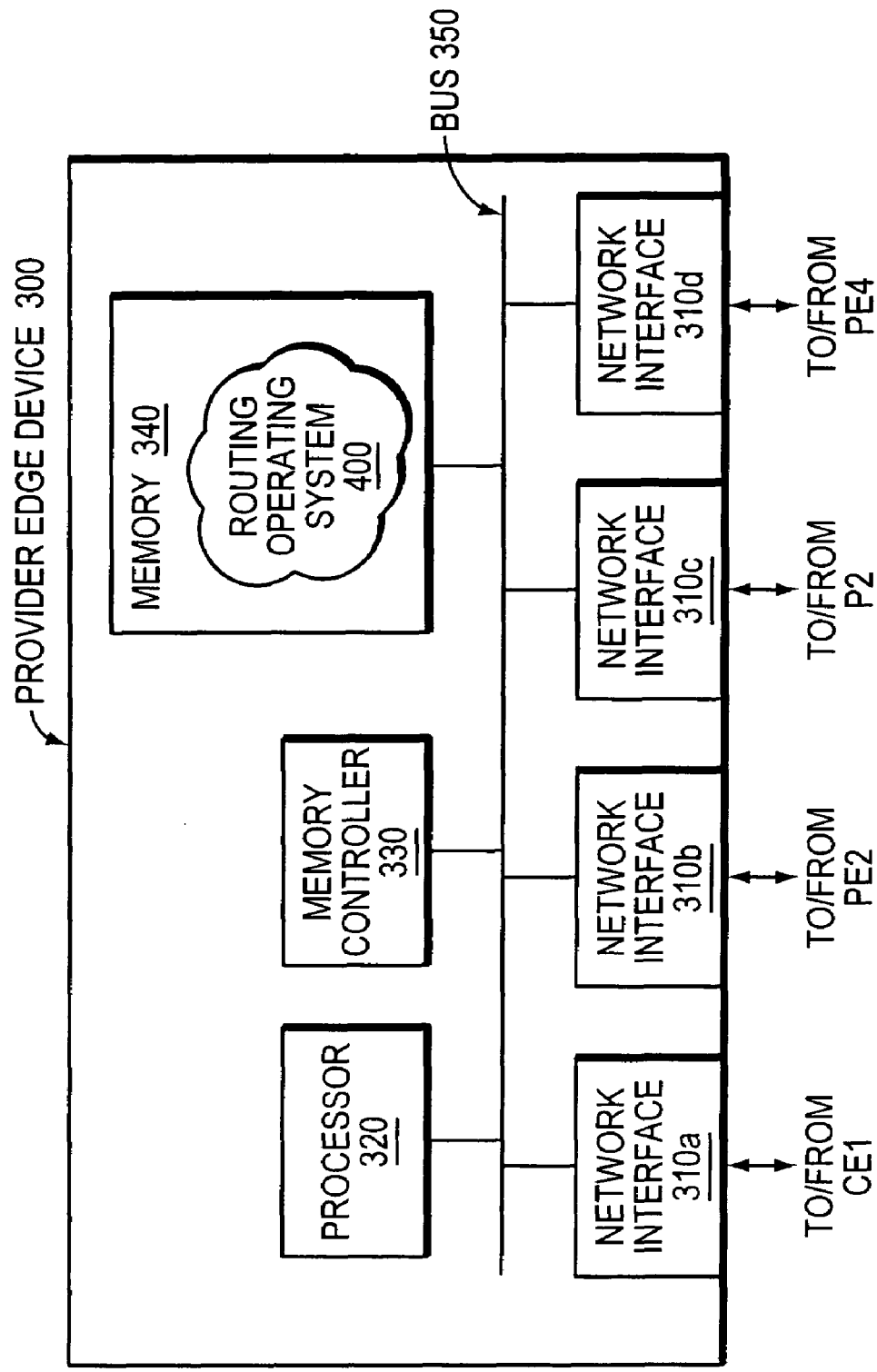
FIG. 3 is a schematic block diagram of a provider edge (PE) device which may implement FRR operations at the edge of a MPLS/VPN network.

FIG. 3 is a schematic block diagram of an exemplary provider edge device 300, such as a router, that may be advantageously used with the present invention. Suitable intermediate nodes that may be used with the present invention include, but are not limited to, the Cisco 7200 and 7600 Series Routers and Catalyst 6500 Series Switches available from Cisco Systems Incorporated, San Jose, Calif. For ease of illustration and description, the PE device 300 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device 300 is merely exemplary and that the advantages of the present invention may be realized on a variety of different hardware platforms having various software capabilities.

The PE device 300 comprises one or more network interfaces 310, a processor 320, a memory controller 330 and a memory 340 interconnected by a system bus 350. Each network interface 310 may be a physical or logical interface that connects the PE device 300 with a neighboring node. For example, as shown, the network interface 310a is coupled to the customer edge device CE1 located in the customer site 120. The network interfaces 310b, 310c and 310d are respectively coupled to the devices PE2, P2 and PE4 in the provider network 110. Each network interface 310 may be adapted to transfer and acquire data packets to and from various transport media such as, e.g., Fast Ethernet (FE), Gigabit Ethernet (GE), wireless links, optical links, etc. Functionally, the interfaces 310 may be configured to communicate using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 340 comprises a plurality of storage locations that are addressable by the processor 320 and the network interfaces 310 via the memory controller 330. The memory 340 preferably comprises a form of random access memory (RAM) that is generally cleared by a power cycle or other reboot operation (e.g., it is a "volatile" memory). For instance, the memory 340 may comprise dynamic RAM (DRAM) and/or synchronous DRAM (SDRAM) storage locations adapted to store program code and data structures accessible to the processor 320. It will be apparent to those skilled in the art that the memory 340 also may comprise other memory means, including various computer-readable media, for storing program instructions and data structures pertaining to the operation of the PE device 300. Further, those skilled in the art will appreciate that at least some portions of the memory 340 may be embodied as electromagnetic signals that are transmitted from a remote memory element to the PE device 300.

The memory 340 stores, among other things, computer-readable instructions for implementing a routing operating system 400 that functionally organizes the PE device 300 by, e.g., invoking network operations in support of software processes and services executing on the processor 320. The IOS™ operating system by Cisco Systems Incorporated is one example of an operating system 400 that may be stored in the memory 340 and executed in accordance with the illustrative embodiments herein. The IOS operating system includes various routing services, such as conventional interior and exterior gateway routing protocols. The present invention also may be deployed with other operating systems, such as the IOS-XR™ operating system by Cisco Systems Incorporated, in which one or more of these routing services is executed as a separate process, i.e., having its own process address space apart from the operating system's.

Figure 4:
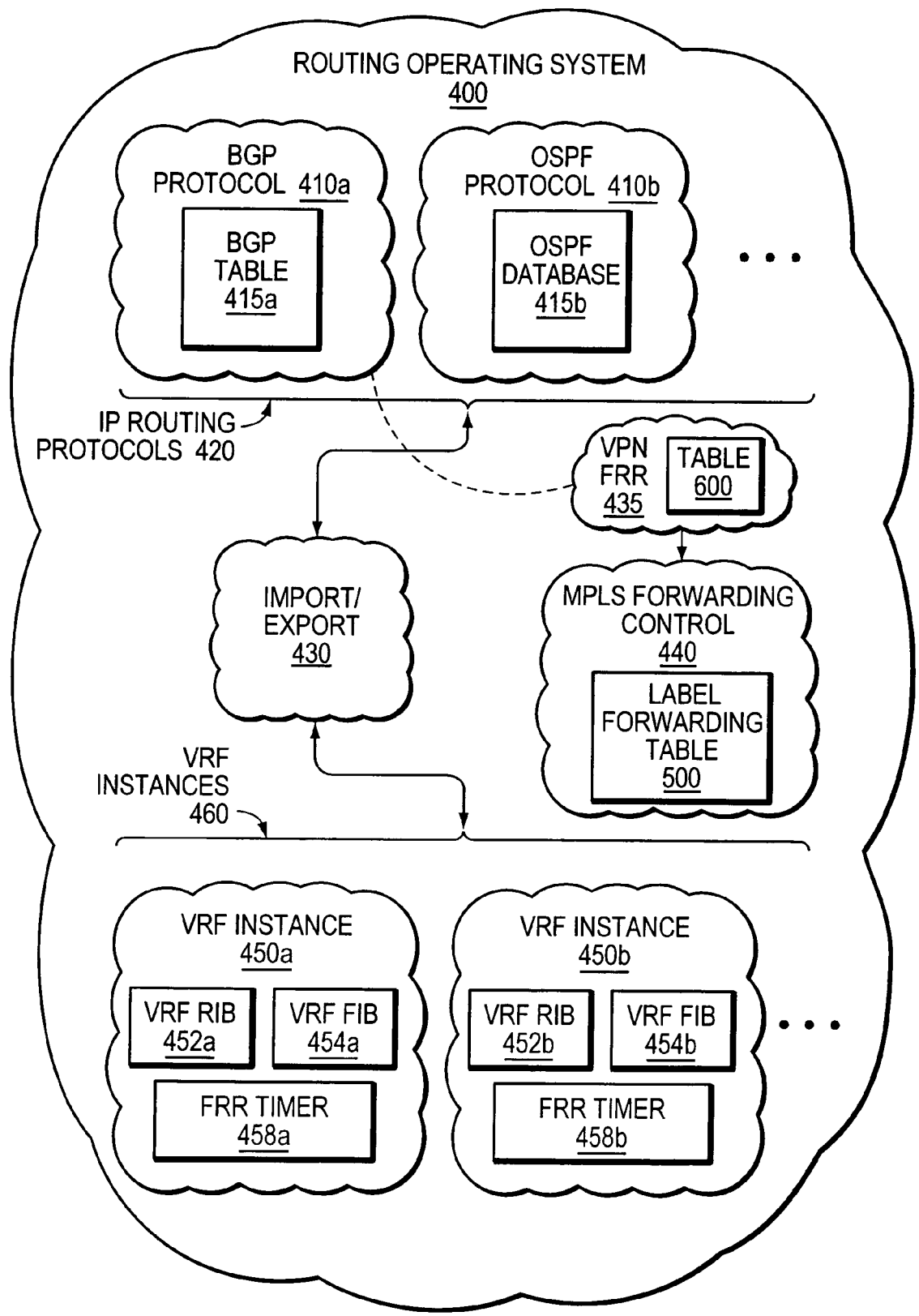
FIG. 4 is a schematic block diagram of an illustrative operating system that may be executed in a PE device configured in accordance with the illustrative embodiments of the invention.

FIG. 4 illustrates an exemplary operating system 400 that may be employed by the PE device 300. The operating system includes various routing services including a set of IP routing protocols 420, an import/export service 430, virtual private network (VPN) FRR service 435, MPLS forwarding control 440 and a set of virtual routing and forwarding (VRF) instances 460. The IP routing protocols 420 enable the PE device to exchange IP-based routing information with other P and PE devices in the provider network 110. For instance, the IP protocols may implement conventional interior and exterior gateway protocols such as the BGP protocol 410a and the OSPF protocol 410b. Each IP protocol 410 may be configured to store its topology and routing information in at least one protocol-specific table or database 415, e.g., stored in the memory 340. For example, the BGP protocol 410a may utilize a BGP table 415a, and the OSPF protocol 410b may maintain an OSPF database 415b and so forth.

The MPLS forwarding control 440 is configured to establish label switched paths (LSP) between the PE device 300 and other PE devices in the provider network 110. To that end, the MPLS forwarding control exchanges label-based routing information with the other P and PE devices. Specifically, the MPLS forwarding control cooperates with neighboring P devices to distribute interior gateway protocol (IGP) labels using, e.g., the LDP or RSVP protocols, and further cooperates with its fully-meshed PE devices to distribute VPN labels using, e.g., the MP-BGP protocol. As used herein, an IGP label identifies an individual "hop" between label switched routers for a destination LSP, and a VPN label identifies a particular customer-site VPN route from a given PE device. Thus, a data packet 105 communicated within the provider network 110 typically includes a MPLS label stack having an IGP label that identifies the packet's exit point from the provider network and a VPN label indicating the packet's associated VPN route.

The MPLS forwarding control 440 maintains a label forwarding table 500 (or "label forwarding information base (LFIB)") that stores label information used to forward data packets from the PE device 300 to neighboring customer sites. The label forwarding table 500 is also configured to store FRR-related information as described in more detail below. The MPLS forwarding control may employ a separate label forwarding table (not shown) for storing label information used to forward data packets within the provider network 110. When the PE device 300 receives a data packet 105 from a P or PE device in the provider network 110, the MPLS forwarding control 440 may locate a VPN label value in the received packet's MPLS label stack. The MPLS forwarding control 440 performs a label lookup operation in its forwarding table 500 based on the packet's VPN label value. The result of the lookup operation can be used to determine a particular PE-CE link over which the packet should be forwarded next.

The set of VRF instances 460 includes one or more separate VRF instances 450, such as the VRF instances 450a and 450b. Each VRF instance manages routing and forwarding operations between the PE device 300 and a selected set of one or more neighboring customer sites, either locally or remotely attached to the provider network 110. For ease of description, it is assumed that each VRF instance 450 is associated with a single customer site and performs packet-forwarding decisions for data packets transmitted to and received from that customer site. Thus, the illustrative embodiments described hereinafter will assume that the routing operating system 400 instantiates a separate VRF instance 450 for every customer site directly attached to the PE device 300. For example, in FIG. 2, the provider edge device PE3 300c may execute separate VRF instances for each of its two neighboring customer sites 120 and 130. In alternate embodiments, VRF instances may be instantiated on a per-VPN basis or in other ways consistent with the network topology.

Each VRF instance 450 includes a VRF-specific routing information base (RIB) 452 and a VRF-specific forwarding information base (FIB) 454. Thus, the VRF instances 450a and 450b respectively include the VRF-specific RIBs 452a and 452b and FIBs 454a and 454b. Each VRF RIB 452 stores layer-3 routing information for address prefixes reachable in its VRF instance's associated customer site, including address prefixes advertised by the customer site as well as prefixes advertised by other sites participating in the same VPN as the customer site. The VRF FIBs 454 store layer-2 forwarding information for IP destinations stored in their associated VRF RIBs. The VRF instances 460 and BGP protocol 410a interface with the import/export service 430 to ensure that the VRF RIBs 452 and the BGP table 415a store consistent sets of routing information. For instance, the import/export service may copy VPN-related routing information from the BGP table and store the VPN routing information in appropriate VRF RIBs. Similarly, the import/export service may redistribute routing information stored in the VRF RIBs into the BGP table.

In accordance with the illustrative embodiments, each VRF instance 450 includes a FRR timer 458 which determines a time duration for which FRR operations are performed in response to, e.g., a failed CE node or a PE-CE link failure at the VRF instance's associated customer site. For example, the VRF instances 450a and 450b are associated with respective FRR timers 458a and 458b. Alternatively, a single FRR timer 458 may be made available to each VRF instance 450. In operation, after the routing operating system 400 detects an inter-domain communication failure at a neighboring customer site, the VPN FRR service 435 starts the FRR timer 458 corresponding to the VRF instance that is associated with the inaccessible customer site. Thereafter, the operating system implements FRR operations for data packets addressed to the inaccessible customer site. The FRR operations continue until the FRR timer expires, at which time normal (non-FRR) routing operations resume and the network is assumed to have converged on its new network topology, i.e., without the failed CE node or PE-CE link.

FIG. 5 illustrates an exemplary label forwarding table 500 that may be used in accordance with the illustrative embodiments. The table 500 includes a plurality of table entries 510, each of which is configured to store, among other things, an address prefix value 520, a VPN label value 530, a VRF identifier value 540, a "FRR enable" flag value 550, a "FRR exclude" flag value 560, a backup PE device identifier 570 and a backup MPLS label stack 580. The address prefix value 520 stores an IP address prefix that is reachable to the PE device 300 from a directly-attached CE device. The VPN label value 530 identifies which VPN includes the address prefix value 520. The VRF identifier value 540 identifies to which VRF instance the address prefix belongs and thus which VRF instance should be used to forward data packets having destination IP addresses matching the address prefix value 520.

Suppose the PE device 300 receives an advertisement message, such as a BGP update message or link-state advertisement, at a network interface 310 directly attached to a neighboring CE device. The MPLS forwarding control 440 is provided with a VPN label value for the address prefixes advertised by the CE device, assuming that such a VPN label value has not already been allocated. The MPLS forwarding control stores the advertised address prefix values 520 together with their allocated VPN label values 530 in appropriate label forwarding table entries 510. Each of these table entries also includes a VRF identifier value 540 identifying the VRF instance 450 associated with the customer site containing the neighboring CE device.

The CE device's advertised address prefixes and their associated VPN label values are disseminated to the other PE devices in the provider network 110, e.g., in one or more MP-BGP messages. As such, the other PE devices are notified that data packets having destination IP addresses matching any of these advertised address prefixes should include the prefixes' associated VPN label values. Subsequently, when a data packet 105 is received at the PE device 300 from a P or PE device, the received data packet's destination IP address and VPN label value can be used to index a matching table entry 510 in the label forwarding table 500. The matching table entry's VRF identifier 540 identifies which VRF instance 450 may be used to forward the received data packet to the neighboring customer site.

The FRR enable flag 550 stores a value indicating whether FRR operations are currently being performed for data packets containing the address prefix 520. When the operating system 400 detects a node or link failure over a PE-CE link, the operating system's VPN FRR service 435 sets the FRR enable flag values for those IP address prefixes 520 that were reachable over the failed PE-CE link. As used herein, the FRR enable flag 550 is "set" when it equals a first predetermined value (e.g. "1"). Otherwise, the FRR enable flag equals a second predetermined value (e.g., "0"). In this way, the value of the FRR enable flag 550 indicates whether FRR operations have been initiated for data packets 105 having destination IP addresses matching the address prefix 520.

The FRR exclude flag 560 stores a value indicating whether FRR operations should not be performed even when the FRR enable flag 550 is set. The FRR exclude flag may equal a first predetermined value (e.g. "1") to indicate that FRR operations are not permitted to be performed and may equal a second predetermined value (e.g., "0") otherwise. The value of the FRR exclude flags 560 may be manually selected, e.g., by a system administrator. However, in a preferred embodiment, the FRR exclude flag values are dynamically determined by the routing operating system 400. The operating system's VPN FRR service 435 may be configured to execute local policy that implements a set of rules for determining which addresses prefixes 520 are eligible for FRR protection. The local policy may specify, for example, that only address prefixes advertised by selected customer sites or by customer sites participating in certain VPNs may be FRR protected. After applying its local policy to the address prefixes 520 stored in the table 500, the operating system sets the FRR exclude flags 560 for those prefixes that the local policy determines are ineligible for FRR protection.

A set of one or more preferred backup PE devices 570 may be associated with each address prefix 520 stored in the table 500. Each backup PE device 570 may be associated with a backup label stack 580, e.g., including IGP and VPN label values, that may be included in FRR rerouted packets 210 matching the address prefix 520 and VPN label value 530. The backup label stack 580 may be determined based on the contents of a separate label forwarding table (not shown) configured to store label information used to forward data packets within the provider network 110. As shown in the exemplary table entry 510, PE3 is a preferred backup PE device for the address prefix 10.1.2.0/24, which is reachable in the VPN associated with the VPN label value 57. Further, the illustrated backup label stack 580 also indicates that FRR data packets forwarded to PE3 should include an IGP label value equal to 100 and a VPN label value equal to 75. In this example, the FRR flags 550 and 560 indicate that FRR operations are currently underway for the address prefix 10.1.2.0/24 and that FRR operations have not be excluded.

Identifying Possible Backup PE Devices

According to the inventive technique, the PE device 300 first identifies a group one or more possible backup edge devices for the address prefix 520 and then selects at least one preferred backup edge device 570 from the group. Although the group of possible backup PE devices may be statically configured at the PE device, e.g., by a system administrator, the group of possible backup PE devices is preferably dynamically "learned" (acquired) by the operating system 400. Specifically, the operating system automatically learns a possible backup PE device for a particular address prefix 520 when the address prefix has been received from both (i) a directly connected (i.e., neighboring) customer site and (ii) another PE device in the provider network 110. The PE device that advertised the address prefix within the provider network is then identified as a possible backup PE device for data packets addressed to the directly-connected customer site.

Preferably, the operating system's VPN FRR service 435 identifies a prefix's possible backup PE devices by monitoring the contents of the BGP table 415a. Conventionally, the BGP table stores reachability information (i.e., address prefixes) advertised to the PE device 300 as well as indications of which network devices advertised the reachability information (i.e., BGP next-hop attributes). Accordingly, if the VPN FRR service's scan of the BGP table 415*a* detects that an address prefix 520 is reachable to the PE device 300 from both a directly-connected CE device and from a remote PE device, the VPN FRR service 435 identifies the remote PE device as a possible backup PE device for the address prefix.

FIG. 6 illustrates a table 600, e.g., stored in the memory 340, that the VPN FRR service 435 may employ for storing possible backup PE devices. The table includes a plurality of table entries 605 having a first column 610 configured to store an address prefix and a second column 620 configured to store one or more possible backup PE devices 622. The possible backup PE devices 622 may be identified by their associated IP addresses. The column 620 is further configured to store a set of zero or more metrics 624 for each possible backup PE device 622. As shown, the table 600 includes an exemplary entry 605 that associates the address prefix 10.1.2.0/24 with two possible backup PE devices 622, i.e., PE2 and PE3. Each of the possible backup devices PE2 and PE3 has a corresponding set of N metrics 624 associated with it.

The VPN FRR service may retrieve the metrics 624 from BGP attributes stored in the BGP table 415*a*. To that end, each PE device may disseminate its associated set of metrics to the other fully-meshed PE devices using one or more BGP attributes advertised in iBGP update messages. Of course, at least some of the metrics also may be obtained or derived in other manners. For instance, the above-described metric M1 may be derived based on IGP cost values stored in the link-state database 415*b*, and thus need not also be advertised in BGP attributes.

Figure 7:
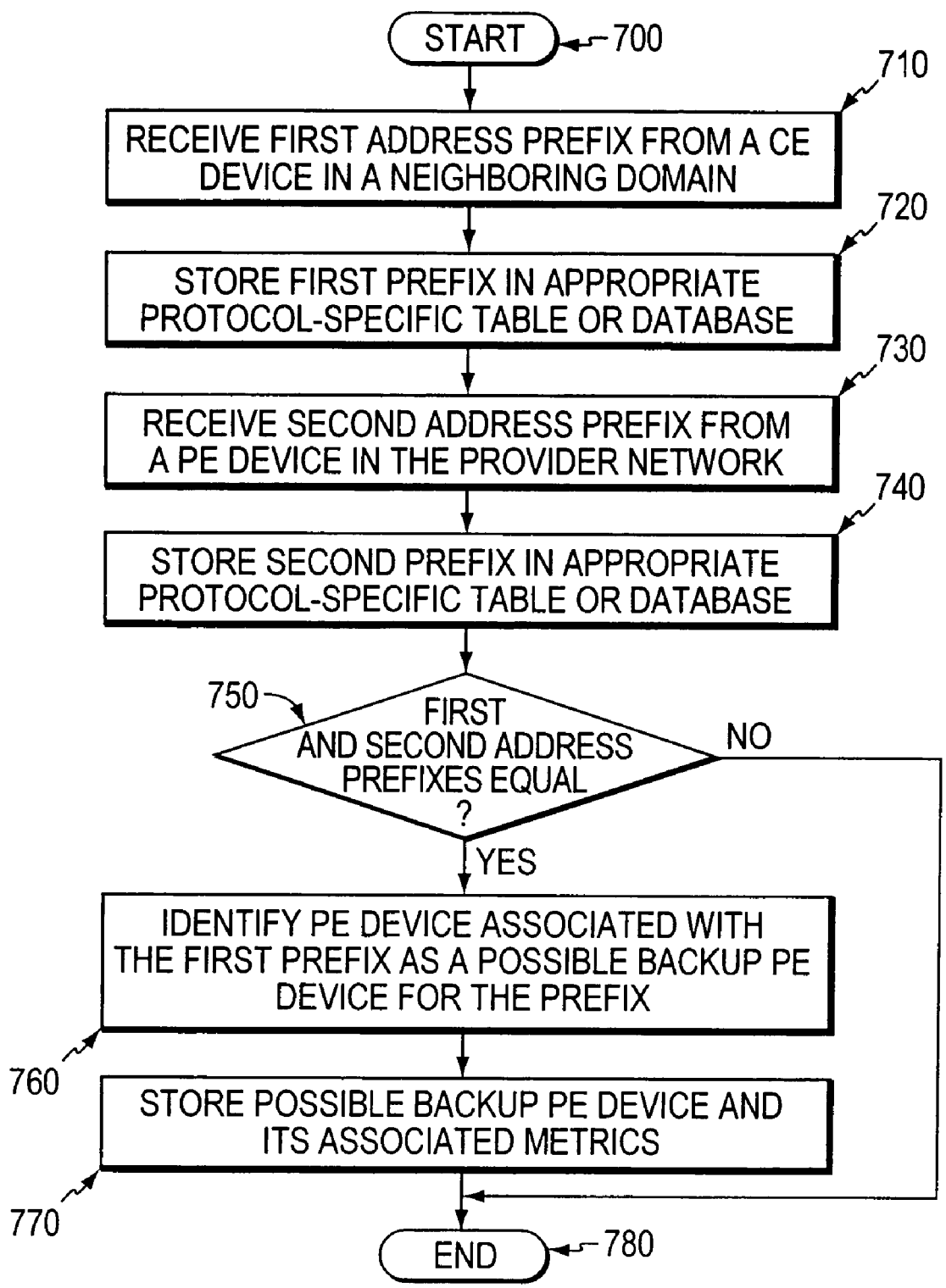
FIG. 7 is a flowchart illustrating a sequence of steps for dynamically identifying a possible backup PE device for a reachable IP address prefix.

FIG. 7 is a flowchart illustrating a sequence of steps that may be performed by a PE device 300 that dynamically identifies a possible backup PE device for a reachable address prefix. The sequence starts at step 700 and proceeds to step 710 where an advertisement message, such as a BGP update message, containing a first address prefix is received at a network interface 310 that is directly connected to a CE device. At step 720, the first address prefix is stored in an appropriate protocol-specific table or database. Here, it is assumed that the first address prefix is received in a BGP update message and is therefore stored in the BGP table 415*a*. Next, at step 730, the PE device 300 receives a second address prefix at a network interface 310 attached to a remote PE device. The second address prefix is stored in an appropriate protocol-specific table, e.g., the BGP table, at step 740.

At step 750, the PE device's VPN FRR service 435 scans the contents of the BGP table 415*a* to determine whether the received first and second address prefixes are equal. If not, then the sequence ends at step 780. However, if the VPN FRR service determines that the first and second address prefixes are the same address prefix, then at step 760 the VPN FRR service identifies the remote PE device as a possible backup PE device for the prefix. At step 770, the VPN FRR service stores the identified possible backup PE device in a table entry 605 associated with the prefix. In addition, the VPN FRR service also retrieves, e.g., from the BGP table 415*a*, measures and/or derives one or more metrics associated with the identified possible backup PE device. The metrics are stored along with the identified possible backup PE device in the prefix's table entry 605. The sequence ends at step 780.

Selecting Preferred Backup PE Device(s)

Figure 8:
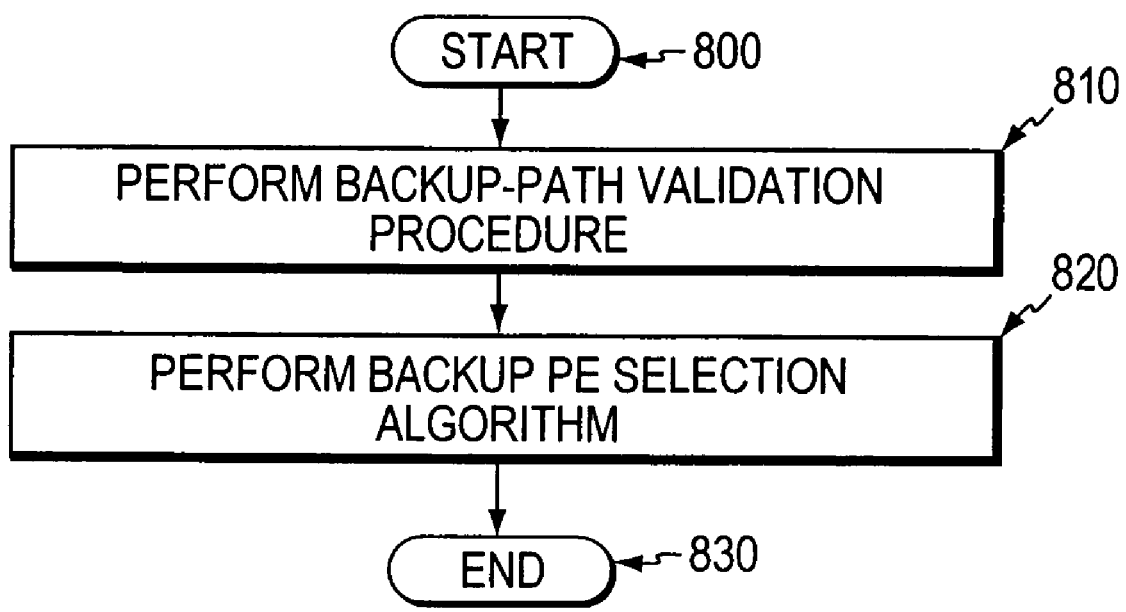
FIG. 8 is a flowchart illustrating a sequence of steps for selecting at least one preferred backup PE device from a group of possible backup PE devices in accordance with the illustrative embodiments of the invention.

FIG. 8 illustrates a sequence of steps that a PE device 300 may perform for selecting at least one preferred backup PE device from a group of possible backup PE devices associated with a given address prefix. Illustratively, the sequence is performed by the VPN FRR service 435 executing in the PE device. However, those skilled in the art will appreciate that other hardware and/or software modules in the PE device (or coupled thereto) may implement any of the steps described below.

The sequence starts at step 800 and proceeds to step 810 where a backup-path validation procedure is performed. After the backup-path validation procedure is completed, a backup PE selection algorithm is performed at step 820. In accordance with the illustrative embodiments, the backup PE selection algorithm may employ a hierarchical selection process or a weighted-metric selection process, or some combination thereof. The sequence ends at step 830.

(i) Backup-Path Validation

After the address prefix's group of possible backup edge devices has been identified, the PE device preferably performs a backup-path validation procedure that (i) determines whether the prefix is reachable and (ii) eliminates possible backup PE devices that are not capable of acting as backup devices. First, the PE device determines whether the prefix's next hop is reachable via an interior route (iBGP, IGP) or from a locally-connected device in a neighboring routing domain. If the prefix is determined to be unreachable, then the prefix is ineligible for FRR protection and thus may not be associated with any of its identified possible backup edge devices. Next, the PE device removes any of the prefix's possible backup edge devices that is not capable of functioning as a backup PE device. A possible backup PE device may advertise its backup capability (or non-capability) using BGP or IGP messages or its backup capability may be set by local policy (e.g., access control lists).

Figure 9:
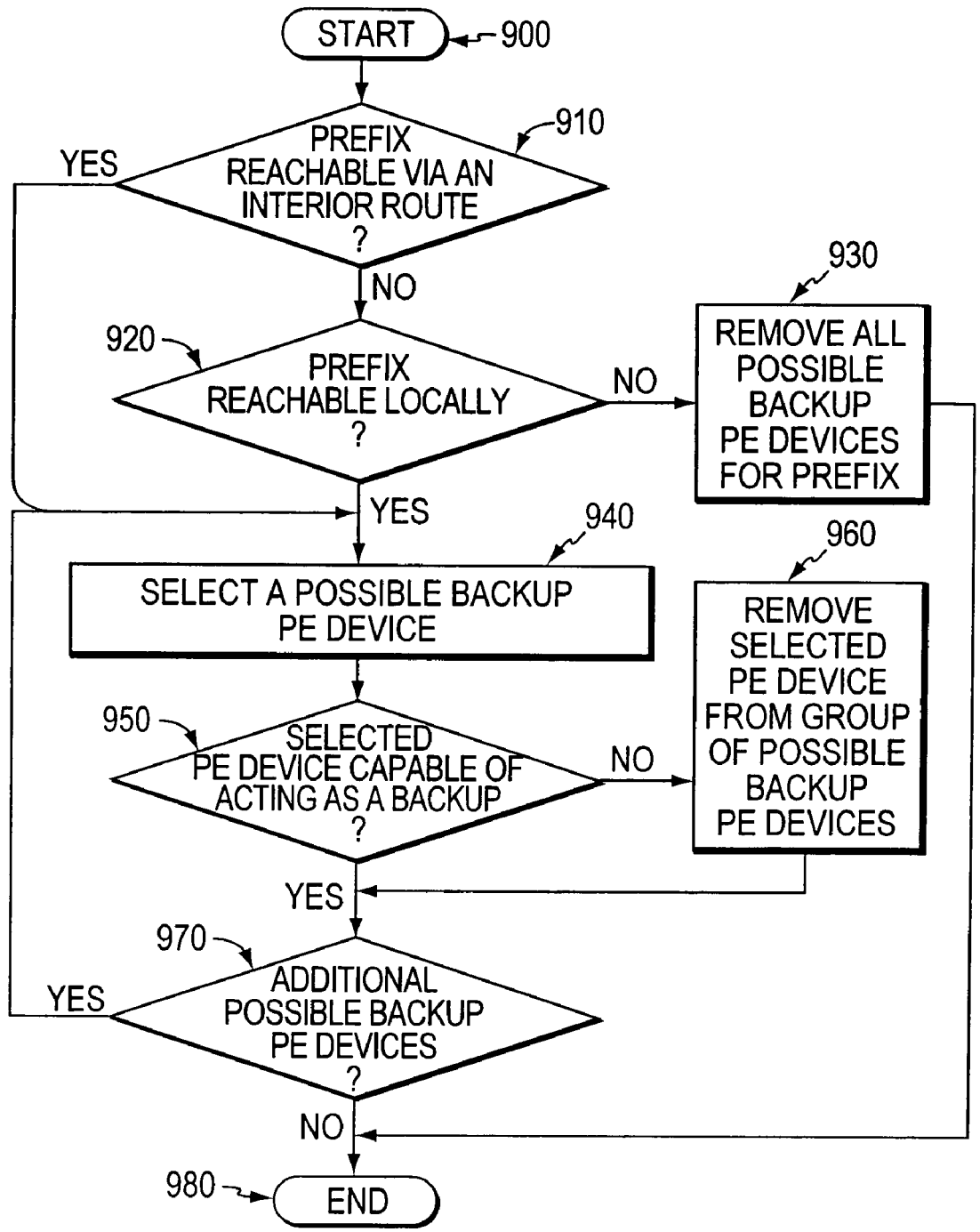
FIG. 9 is a flowchart illustrating a sequence of steps for performing a backup-path validation procedure in accordance with the illustrative embodiments.

FIG. 9 illustrates a sequence of steps that the PE device may use to perform a backup-path validation procedure for a given address prefix. Here, it is assumed that the PE device's VPN FRR service 435 has already searched its table 600 and located an entry 605 containing the prefix's identified set of possible backup PE devices. The sequence starts at step 900 and proceeds to step 910 where it is determined whether the prefix is reachable by an interior route in the provider network 110. To that end, the VPN FRR service may determine whether the prefix is stored in at least one iBGP table or IGP database 415. If the prefix is determined to be reachable, the sequence advances to step 940. Otherwise, at step 920, it is determined whether the prefix is reachable locally, i.e., from a directly-attached CE device in a neighboring routing domain. In this case, the VPN FRR service may search for the prefix in the BGP table 415*a*. If the prefix is determined to be unreachable locally or via an interior route, then, at step 930, all possible backup PE devices 622 for the prefix are removed from the prefix's table entry 605 and the sequence ends at step 980.

On the other hand, if the prefix is determined to be reachable, then at step 940 a possible backup PE device 622 is chosen from the prefix's identified group of possible backup PE devices stored in the table 600. At step 950, it is determined whether the chosen possible backup PE device is, in fact, capable of acting as a backup PE device. The possible backup PE device may advertise its capability (or non-capability) of acting as a backup PE device by advertising iBGP or IGP messages to the fully-meshed PE devices. Alternatively, the possible backup PE device's backup capability may be set by local policy, such as in an access control list. If the chosen possible backup PE device is determined to be incapable of acting as a backup PE device, it is removed from the group of possible backup PE devices associated with the prefix in the table 600, at step 960. At step 970, the prefix's entry 605 is examined to determine whether there any other possible backup PE devices identified for the prefix. If so, the sequence returns to step 940, otherwise the sequence ends at step 980.

Figure 10:
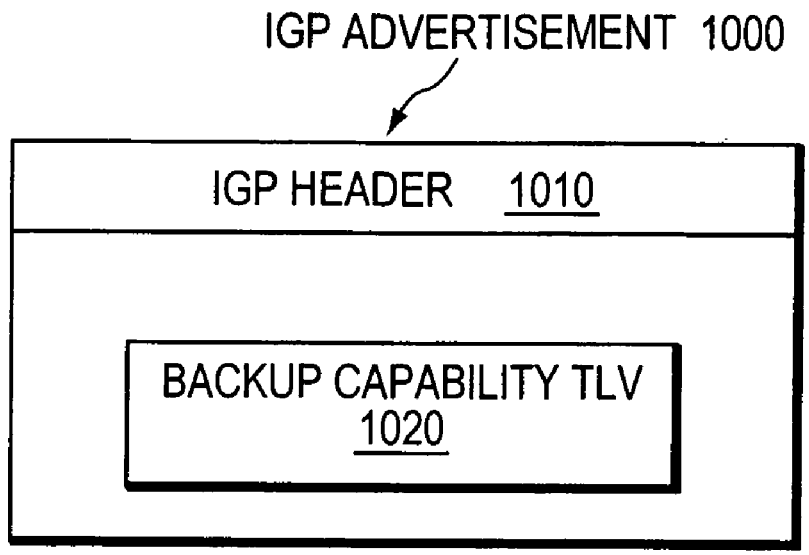
FIG. 10 is a schematic block diagram of an exemplary interior gateway protocol (IGP) advertisement that may be used to communicate a PE device's backup capability or non-capability.

FIG. 10 illustrates an IGP advertisement 1000, such as an OSPF link-state advertisement or IS-IS link-state packet, that may be used to advertise a PE device's capability or non-capability of acting as a backup PE device. The IGP advertisement 1000 includes, among other things, a conventional IGP header 1010 and a backup-capability TLV 1020. The TLV 1020 stores an indication (such as a predefined value) that indicates whether the PE device that disseminated the advertisement 1000 is capable of functioning as a backup PE device. For example, the backup-capability TLV that may be embodied as an OSPF or IS-IS Router Capabilities TLV, which are generally described in more detail in the IETF Internet Drafts draft-ietf-ospf-cap-06.txt, entitled *Extensions to OSPF for Advertising Optional Router Capabilities*, published February 2005, by Lindam et al. and draft-ietf-isis-caps-00.txt entitled *IS-IS Extensions for Advertising Router Information*, published January 2005, by Vasseur et al., both of which are hereby incorporated by reference as though fully set forth herein.

Figure 11:
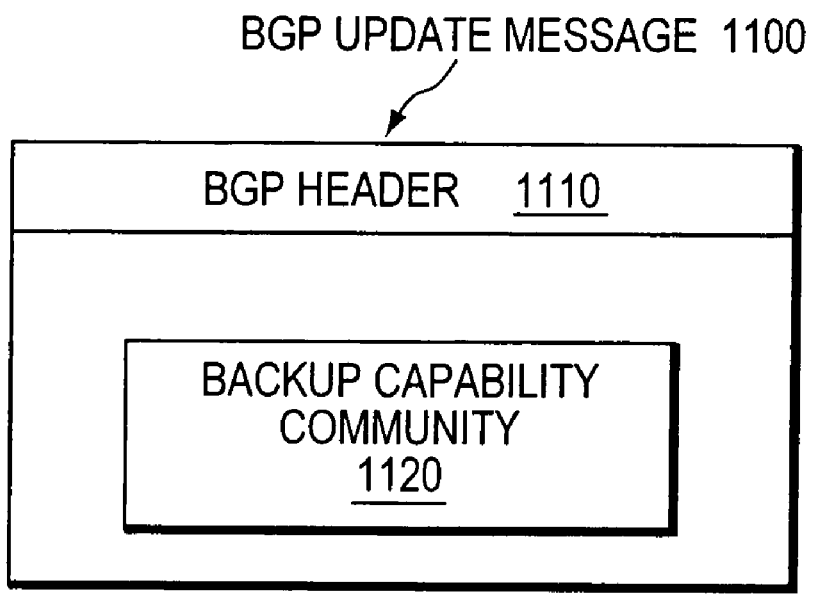
FIG. 11 is a schematic block diagram of an exemplary Border Gateway Protocol (BGP) update message that may be used to communicate a PE device's backup capability or non-capability.

FIG. 11 illustrates a BGP update message 1100 that may be used to advertise a PE device's capability or non-capability of acting as a backup PE device. The BGP advertisement 1100 includes, among other things, a conventional BGP header 1110 and a backup-capability community attribute 1120. The BGP community attribute 1120 stores an indication of whether the PE device that disseminated the BGP update message 1100 is capable of functioning as a backup PE device. The backup-capability community attribute may be a predetermined BGP extended community attribute that is configured to store a value indicating the PE device's backup-capability status. As noted, BGP extended community attributes are generally described in more detail in the IETF Internet Draft draft-ietf-idr-bgp-ext-communities-08.txt, entitled *BGP Extended Communities Attribute*, dated February 2005, by Sangli et al., which is hereby incorporated by reference as though fully set forth herein.

(ii) Hierarchical Backup PE Device Selection

In accordance with the first illustrative embodiment, a hierarchy of selection criteria is used to select one or more preferred backup PE devices for a given address prefix. In this embodiment, each backup-edge-device metric is assigned a relative preference level. Then, a first selection criterion evaluates the most-preferred metric (i.e., the metric having the greatest relative preference level) for each of the possible backup PE devices associated with the prefix. The possible backup PE device having the greatest (or least) value of this metric is selected as the preferred backup PE device. If multiple possible backup PE devices satisfy the first criterion, then a second selection criterion may further reduce the set of possible backup PE devices. Preferably, the second criterion compares values of the next most-preferred metric. Similarly, a third criterion compares values of the third most-preferred metric, and so on. This hierarchical selection process is repeated until a desired number of backup PE devices is selected for the given address prefix.

If, at any stage of the hierarchical selection process, multiple possible backup PE devices satisfy the selection criteria, the process may be terminated. In this case, a preferred backup PE device may be randomly selected from the possible backup PE devices that satisfied the selection criteria at the time that the hierarchical selection process was terminated. Alternatively, network traffic addressed to the given address prefix may be load balanced (proportionally or otherwise) across the possible backup PE devices satisfying the selection criteria.

For example, suppose a prefix's possible backup edge devices PE2 and PE3 are each associated with a set of metrics M1, M2 and M3, of which the metric M1 has the highest relative preference level and metric M3 has the lowest relative preference level. The first selection criterion evaluates M1(PE2) and M1(PE3), where M(PE) represents the value of a metric M associated with a possible backup edge device PE. The possible backup edge device PE2 or PE3 having the greatest (or least) value of metric M1 is selected as the prefix's preferred backup edge device. However, if both M1(PE2) and M1(PE3) equal the same value, then the second selection criterion may evaluate the next most-preferred metric values, i.e., M2(PE2) and M2(PE3). Again, if these evaluate to the same value, then the third selection criterion compares the values of M3(PE2) and M3(PE3). At any stage of this hierarchical selection process, the criteria may be configured to stop evaluating metric values and instead load balance traffic over both the backup edge devices PE2 and PE3, or randomly select either PE2 or PE3 as the preferred backup edge device.

Figure 12:
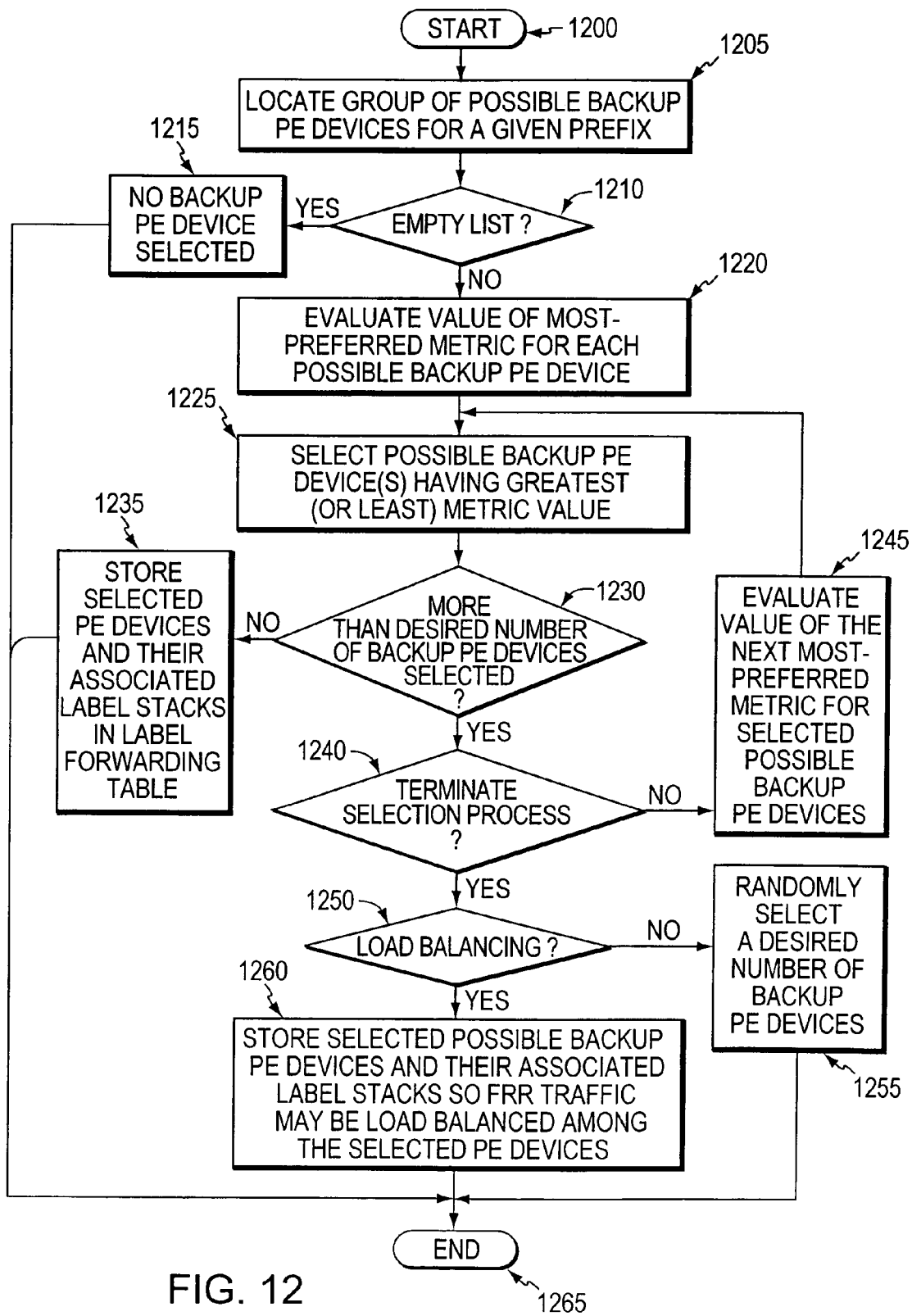
FIG. 12 is a flowchart illustrating a sequence of steps for selecting one or more preferred backup PE devices for a given address prefix using a novel hierarchical selection process in accordance with a first illustrative embodiment of the invention.

FIG. 12 illustrates a sequence of steps that may be performed for selecting at least one preferred backup PE device for a given address prefix using the illustrative hierarchical selection process. The sequence starts at step 1200 and proceeds to step 1205 where the prefix's identified group of possible backup PE devices is located in the table 600. Next, at step 1210, if the list of possible backup PE devices is empty, i.e., there were not any identified possible backup PE devices for the prefix or all the prefix's identified possible backup PE devices were removed by the backup-path validation procedure, the sequence advances to step 1215 where no preferred backup PE device is selected for the prefix. Then, the sequence ends at step 1265.

When there is at least one possible backup PE device 622 associated with the prefix, the value of a most-preferred metric is evaluated for each possible backup PE device, at step 1220. Then, at step 1225, the possible backup PE device(s) having the greatest (or least) value of the most-preferred metric is selected as the preferred backup PE device(s) for network traffic addressed to the prefix. Next, at step 1230, it is determined whether more than a desired number (e.g., one) of preferred backup PE devices were selected at step 1225. If not, then at step 1235 the selected backup PE devices and their associated MPLS label stacks are stored in appropriate fields 570 and 580 of a label forwarding table entry 510 corresponding to the address prefix. The sequence ends at step 1265.

If, at step 1230, it is determined that more than the desired number backup PE devices was selected, then a determination is made as to whether the hierarchical selection process should be terminated, at step 1240. For instance, the selection process may be terminated due to, e.g., time and/or system resource constraints in the PE device. If it is determined that the selection process should not be terminated, then at step 1245 the value of the next most-preferred metric is evaluated for each of the possible backup PE devices most-recently selected by the hierarchical selection algorithm at step 1225. Then, the sequence returns to step 1225.

However, if the hierarchical selection process is to be terminated, it is next determined at step 1250 whether network traffic addressed to the prefix should be load balanced (proportionally or otherwise) among the possible backup PE devices most-recently selected at step 1225. Preferably, a system administrator manually configures the PE device implementing the novel hierarchical selection process regarding whether network traffic should be load balanced across a selected set of possible backup PE devices. When it is determined that network traffic should be load balanced, the selected backup PE devices and their associated MPLS label stacks are stored in the prefix's corresponding label forwarding table entry 510, at step 1260, and the sequence ends at step 1265. If load balancing is not employed, then at step 1255 a desired number of backup PE devices is randomly selected from the possible backup PE devices most-recently selected at step 1225. The sequence ends at step 1265.

(iii) Weighted-Metric Backup PE Device Selection

In the second illustrative embodiment, a mathematical function is used to select at least one preferred backup PE device for a given address prefix. The mathematical function is preferably an objective polynomial function that calculates a weighted combination of the metrics associated with a possible backup PE device; this weighted combination of metrics may be interpreted as an "overall" metric for the device. For instance, an exemplary polynomial function F(PE) that may be used to calculate an overall metric for a possible backup device PE may be represented as the following weighted sum:

$$F(PE) = \sum_{i=1}^{N} w_i \cdot M_i(PE) \qquad (1)$$

where $M_i(PE)$ is the value of the $i^{th}$ metric associated with the possible backup device PE and $w_i$ is a numerical weight assigned, e.g., by a system administrator, to the $i^{th}$ metric.

Notably, although the weights $w_i$ are preferably values greater than or equal to zero, it is also contemplated that, in some cases, at least one of the weight values may be negative. Also, a PE device may employ different sets of weight values for different address prefixes. For instance, weight values $w_i$ may be selected on a per-customer site or per-VPN basis. For example, a first set of weight values may be input to the function F(PE) for address prefixes that are reachable in the customer site 120, whereas a separate set of weight values may be utilized for address prefixes advertised from the customer site 130. It is further noted that the PE devices 300 in the provider network 110 need not employ the same set of weight values $w_i$, and at least some PE devices may locally select their own sets of weight values, which may or may not overlap with weight values selected at the other fully-meshed PE devices.

In operation, the set of metric values $M_i$ for each possible backup PE device associated with the address prefix is input to the polynomial function F(PE). The overall metrics calculated for the devices are compared and the possible backup PE device having the greatest (or least) overall metric value is selected as the preferred backup PE device for FRR rerouted traffic addressed to the prefix. In the event that multiple possible backup PE devices are selected based on the output of the polynomial function, the network administrator may randomly select at least one of the selected devices or may choose a metric as a tie-breaker among the devices. Alternatively, the network traffic instead may be load balanced (proportionally or otherwise) across the selected backup PE devices.

Figure 13:
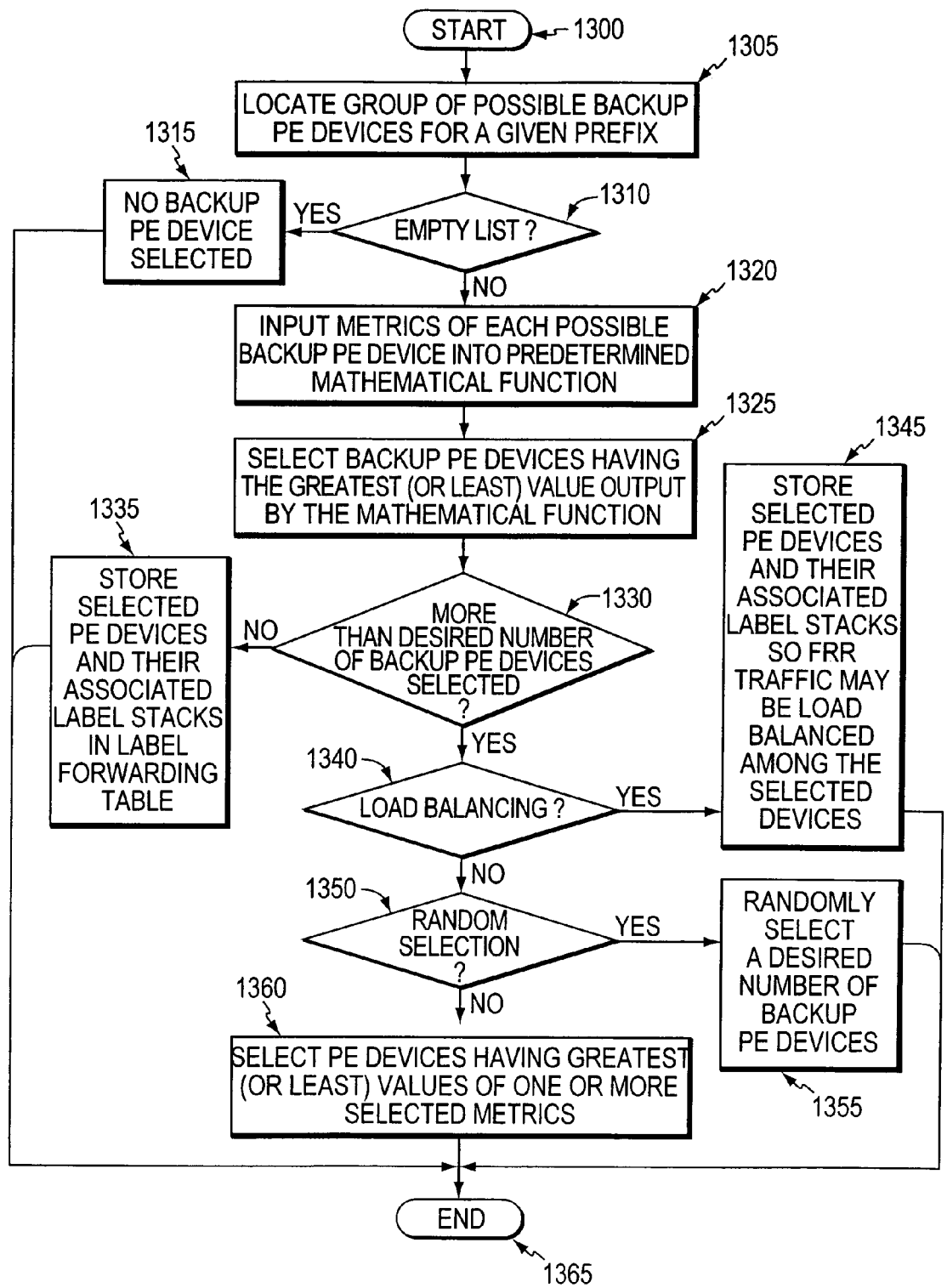
FIG. 13 is a flowchart illustrating a sequence of steps for selecting one or more preferred backup PE devices for a given address prefix using a novel weighted-metric selection process in accordance with a second illustrative embodiment of the invention.

FIG. 13 illustrates a sequence of steps that may be performed for selecting at least one preferred backup PE device for a given address prefix using the illustrative weighted-metric selection process. The sequence starts at step 1300 and proceeds to step 1305 where the prefix's identified group of possible backup PE devices is located in the table 600. Next, at step 1310, if the list of possible backup PE devices is empty, i.e., there were not any identified possible backup PE devices for the prefix or all the prefix's identified possible backup PE devices were removed by the backup-path validation procedure, the sequence advances to step 1315 where no preferred backup PE device is selected for the prefix. Then, the sequence ends at step 1365.

When there is at least one possible backup PE device 622 associated with the prefix, each possible backup PE device's associated set of metrics 624 is input to a predetermined mathematical function, such as the weighted polynomial function F(PE) described above, at step 1320. Then, at step 1325, the possible backup PE device(s) having the greatest (or least) value output by the mathematical function is selected as the preferred backup PE device(s) for network traffic addressed to the prefix. Next, at step 1330, it is determined whether more than a desired number (e.g., one) of preferred backup PE devices were selected at step 1325. If not, then at step 1335 the selected backup PE devices and their associated MPLS label stacks are stored in appropriate fields 570 and 580 of a label forwarding table entry 510 corresponding to the address prefix. The sequence ends at step 1365.

If, at step 1330, it is determined that more than the desired number backup PE devices was selected, then a determination is made as to whether network traffic addressed to the prefix should be load balanced (proportionally or otherwise) among the selected backup PE devices. Preferably, a system administrator manually configures the PE device implementing the novel weighted-metric selection process regarding whether network traffic should be load balanced across a selected set of backup PE devices. When it is determined that network traffic should be load balanced among the selected backup PE devices, the selected backup PE devices and their associated MPLS label stacks are stored in the prefix's corresponding label forwarding table entry 510, at step 1345, and then the sequence ends at step 1365.

If load balancing is not employed, then at step 1350 it is determined whether a desired number of backup PE devices should be randomly selected from the selected backup PE devices. If so, the desired number of backup PE devices are randomly selected in accordance with a random selection algorithm, at step 1355; the sequence ends at step 1365. Otherwise, at step 1360, the desired number of backup PE devices are selected based on which of the selected possible backup PE device(s) has the greatest (or least) value of one or more selected metrics. The sequence ends at step 1365.

Performing FRR Operations

Figure 14:
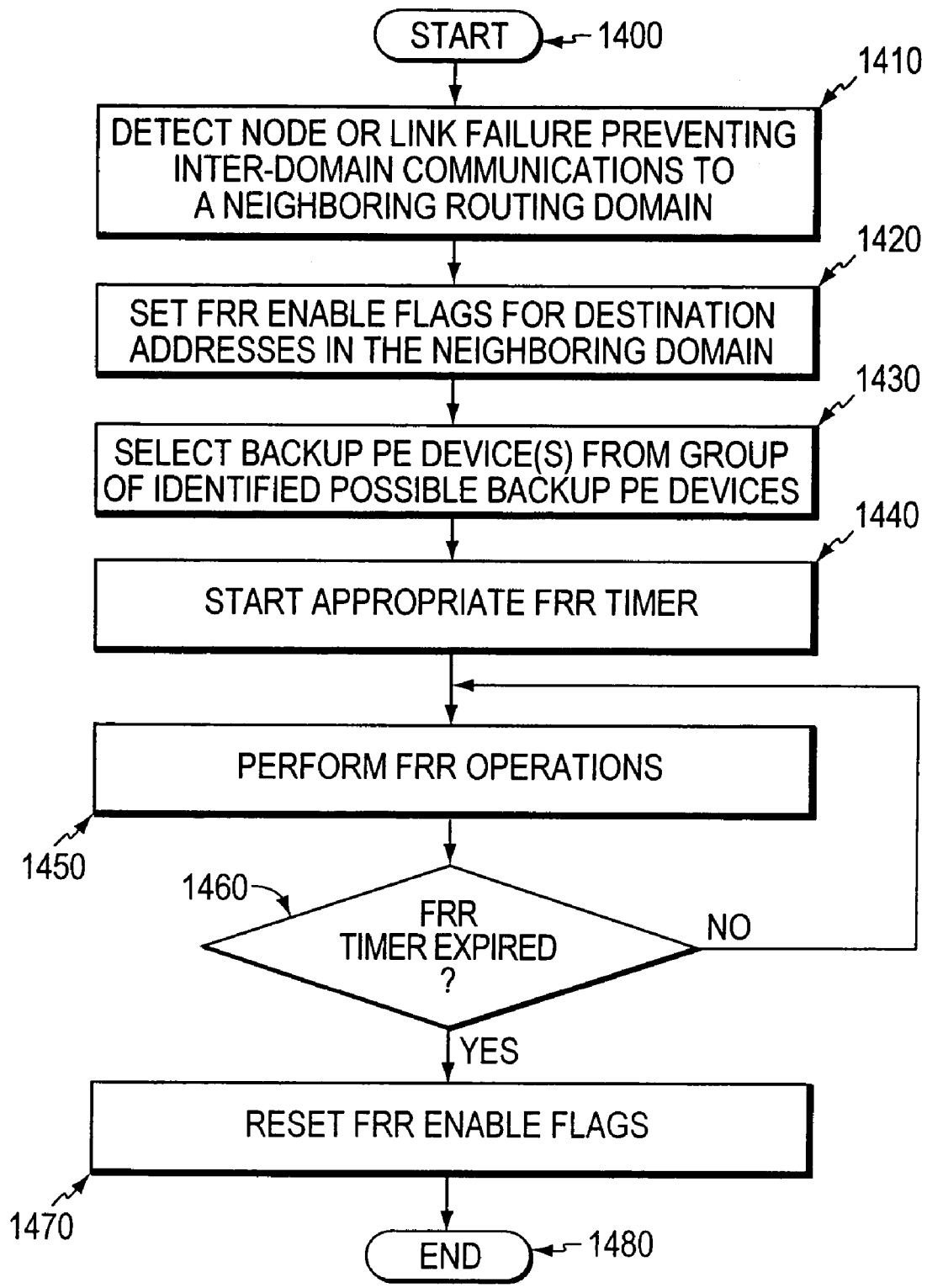
FIG. 14 is a flowchart illustrating a sequence of steps for implementing FRR operations for a predetermined time interval.

FIG. 14 is a flowchart illustrating a sequence of steps that may be performed to initiate FRR operations at a PE device 300. The sequence starts at step 1400 and proceeds to step 1410 where the routing operating system 400 detects a CE node or PE-CE link failure preventing inter-domain communications with a neighboring routing domain. For instance, the operating system may determine that packets are no longer being received at a network interface 310 connected to the neighboring customer site or may receive an explicit notification, e.g., indicating that a CE device will soon go "off-line" or is otherwise about to fail. The operating system's IP routing protocols 420, such as the BGP protocol 410*a*, may be used to communicate this detected topology change to the other fully-meshed PE devices in the provider network 110.

At step 1420, the operating system's VPN FRR service 435 "walks through" the label forwarding table 500 to locate table entries 510 containing VRF identifier values 540 corresponding to the customer site that was made inaccessible as a result of the failed PE-CE data link. For each such located table entry 510, the entry's FRR enable flag value 550 is set, thereby indicating that FRR operations should be performed for packets containing destination IP addresses matching the entry's address prefix 520. For each located entry 510, the entry's address prefix 520 is used as an index into the VPN FRR service's table 600. In particular, the VPN FRR service locates table entries 605 containing the prefixes 520 and, for each prefix, the VPN FRR service selects at least one preferred backup PE device for network traffic addressed to that prefix, at step 1430. Each preferred backup PE device may be selected based on its associated set of metrics 624, which are also stored in the table 600. The metrics are input to a novel selection algorithm that selects the preferred backup edge device(s) using a hierarchical selection process or a weighted-metric selection process, or some combination thereof. Those skilled in the art will appreciate that the preferred backup PE device(s) may be determined using an appropriate selection algorithm at any time before or after the CE node or PE-CE link failure is detected.

Next, at step 1440, the operating system starts an appropriate FRR timer 458, i.e., corresponding to the VRF instance whose identifier 540 is stored in the located table entries. At step 1450, FRR operations are performed for data packets having destination IP addresses and VPN label values matching label forwarding table entries 510 whose FRR enable flags 550 are set. The operating system determines whether the FRR timer 458 has expired, at step 1460. If not, the sequence returns to step 1450 and FRR operations continue. Otherwise, at step 1470, the previously-set FRR enable flags are reset to indicate that FRR operations are no longer being performed for data packets addressed to the inaccessible customer site. The sequence ends at step 1480.

Figure 15:
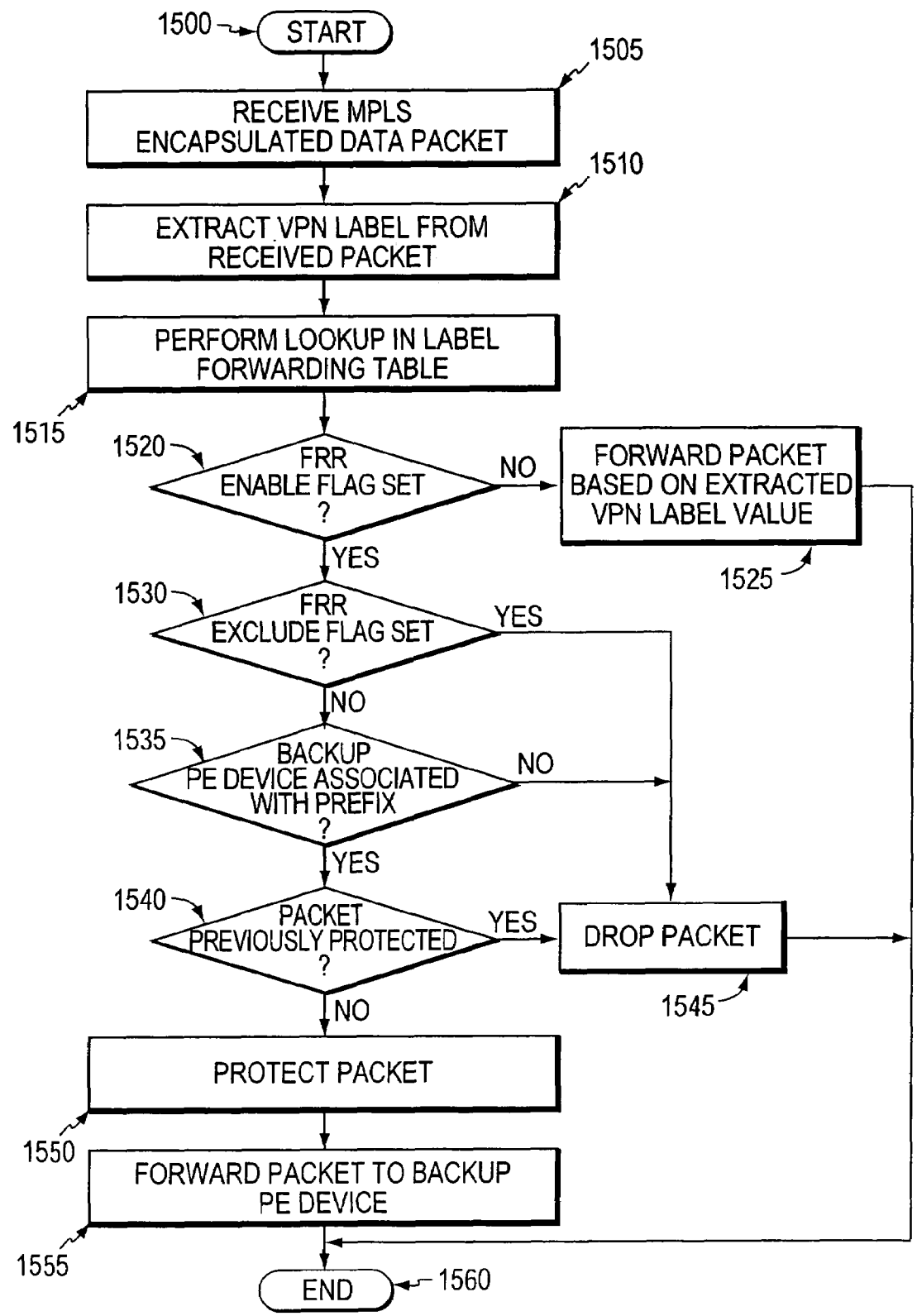
FIG. 15 is a flowchart illustrating a sequence of steps for performing FRR operations at the edge of a network in accordance with the illustrative embodiments of the invention.

FIG. 15 illustrates a flowchart containing a sequence of steps for performing FRR operations. The sequence begins at step 1500 and proceeds to step 1505 where a MPLS encapsulated data packet is received at a PE device 300. The received packet is forwarded to the MPLS forwarding control 440 which extracts a VPN label value from the received packet, at step 1510, and uses the extracted VPN value to perform a lookup operation in its label forwarding table 500, at step 1515. Specifically, a label forwarding table entry 510 is located having an address prefix 520 matching the packet's destination IP address and a VPN label value 530 equal to the packet's extracted VPN label value.

At step 1520, the FRR enable flag 550 in the located table entry 510 is analyzed to determine whether FRR operations are currently being performed for packets containing the received VPN label value. If FRR operations are not currently underway, the received packet is processed based on the forwarding entry 510 within the label forwarding table 500. The received data packet is then forwarded to its next-hop destination at step 1525. The sequence ends at step 1560.

If, at step 1520, the value of the FRR enable flag indicates that FRR operations should be performed, then at step 1530 the FRR exclude flag 560 is analyzed to determine whether the packet is permitted to be FRR rerouted. If the packet is not allowed to be rerouted, the packet is dropped at step 1545 and the sequence ends at step 1560. When the FRR exclude flag value indicates that FRR operations may be performed for the received packet, the sequence advances to step 1535 where it is determined whether there is at least one preferred backup PE device 570 identified in the received packet's matching label forwarding table entry 510. If no such backup PE device exists, then at step 1545 the packet is dropped and the sequence ends at step 1560.

At step 1540, the routing operating system 400 determines whether the received packet has been previously FRR protected. For instance, the packet's protected status may be ascertained based on FRR status information transported in a P field 212 of the received packet. In accordance with the inventive FRR technique, a protected packet may not be protected a second time. Therefore, if at step 1540 the received packet is determined to already have been protected, the packet is dropped at step 1545 and the sequence ends at step 1560. On the other hand, if the packet was not previously protected, the sequence advances to step 1550 and the packet is protected. For instance, a FRR protected designation may be concatenated to or incorporated into the packet, or the packet's backup PE device 570 may be separately "signaled" of the packet's protected status, e.g., using an appropriate signaling protocol.

The protected packet is forwarded to its preferred backup PE device, at step 1555, preferably via a MPLS or IP tunnel. If more than one preferred backup PE device 570 is stored in the packet's matching label forwarding table entry 510, one of the preferred backup PE devices may be selected, e.g., based on a load-balancing algorithm or random-selection algorithm, and then the packet is forwarded to the selected preferred backup PE device. The sequence ends at step 1560.

CONCLUSION

Advantageously, the inventive technique may utilize various types of metrics, without limitation, to characterize possible backup edge devices. Moreover, an edge device in the computer network may use a locally-deployed backup-edge-device selection algorithm, which may or may not be consistent with the selection algorithms deployed at other edge devices. For example, a first edge device may select backup edge devices using the illustrative hierarchical selection process, whereas a second edge device in the same network may select backup edge devices using the illustrative weighted-metric selection process.

The foregoing has been a detailed description of illustrative embodiments of the invention. Various modifications and additions can be made without departing from the spirit and scope of the invention. For example, while the inventive FRR technique has been illustratively described with respect to MPLS/VPN networks, it is also expressly contemplated that the invention may be deployed at the edge of other types of networks and subnetworks, such as autonomous systems, broadcast domains, routing areas, etc., that implement various network communication protocols. Although the illustrative embodiments described herein assume a one-to-one correspondence between customer sites and VPNs, those skilled in the art will understand that the FRR technique also may be deployed in networks in which customer sites are permitted to participate in more than one VPN. Similarly, at least some VRF instances 450 may be associated with customer sites on a one-to-many basis, even though the illustrative embodiments, for simplicity, have assumed a one-to-one correspondence.

Furthermore, the illustrative embodiments may be modified to utilize IP Version 6 (IPv6) technology. The IPv6 protocol has been introduced to increase the number of available network addresses and provide additional services at the internetwork layer of the conventional TCP/IP protocol stack. The IPv6 protocol employs a larger address space than its IPv4 predecessor, and utilizes 128 bit (sixteen byte) values to address network nodes rather than the 32 bit addresses employed by IPv4. Those skilled in the art will appreciate that the illustrative embodiments described herein are equally applicable to other address formats, including IPv6 addresses.

It is expressly contemplated that the teachings of this invention can be implemented as software, including a computer-readable medium having program instructions executing on a computer, hardware, firmware, or a combination thereof. For instance, the invention may be implemented by a PE device 300 having one or more processors, some of which may reside on the network interfaces 310 or on line cards containing the network interfaces. Further, the memory 340 may be distributed among a plurality of different memory elements, both local and remote to the PE device 300. In general, the inventive technique therefore may be implemented in various combinations of hardware and/or software. Accordingly, this description is meant to be taken only by way of example and not to otherwise limit the scope of the invention.

What is claimed is:

1. A method for performing fast reroute (FRR) operations at the edge of a computer network, the computer network having an edge device coupled to a neighboring routing domain, the method comprising:
    identifying a set of multiple possible backup edge devices for an address prefix advertised by a device in the neighboring routing domain;
    associating one or more metrics with each of the address prefix's identified possible backup edge devices;
    detecting a loss of communication between the edge device and the neighboring routing domain;
    selecting a preferred backup edge device from the address prefix's identified set of possible backup edge devices based on the value of at least one of the metrics associated with the possible backup edge devices;
    receiving a data packet at the edge device, the received data packet containing a destination address matching the address prefix;
    determining whether the received data packet was previously rerouted in accordance with FRR operations; and
    rerouting, in response to determining that the received data packet was not previously rerouted, the received data packet to the preferred backup edge device for forwarding to the neighboring routing domain.

2. The method of claim 1, wherein the step of selecting the preferred backup edge device further comprises:
    performing a hierarchical selection process that inputs the metrics associated with each possible backup edge device into a sequence of selection criteria, each criterion in the sequence being applied to the metrics until the preferred backup edge device is identified by a criterion or the selection process is terminated.

3. The method of claim 2, wherein the hierarchical selection process further comprises:
    (a) assigning a relative preference level for each type of metric associated with the possible backup edge devices;
    (b) evaluating, for each possible backup edge device, a value of the metric having the greatest relative preference level;
    (c) identifying the preferred backup edge device as the possible backup edge device having the greatest evaluated metric value;
    (d) if multiple preferred backup edge devices are identified at step (c), then evaluating the next most-preferred metric for each of the identified preferred backup edge devices; and
    (e) repeating steps (c) and (d) until a single preferred backup edge device is identified or every type of metric input to the hierarchical selection process has been evaluated.

4. The method of claim 2, further comprising:
    terminating the hierarchical selection process before a single preferred backup edge device is identified; and
    load balancing rerouted network traffic among each of the possible backup edge devices that satisfied the selection criteria at the time the selection process was terminated.

5. The method of claim 2, further comprising:
    terminating the hierarchical selection process before a single preferred backup edge device is identified; and
    randomly selecting a preferred backup edge device from among the possible backup edge devices that satisfied the selection criteria at the time the selection process was terminated.

6. The method of claim 1, wherein the step of selecting the preferred backup edge device further comprises:
    performing a weighted-metric selection process that inputs the metrics associated with each possible backup edge device into a predetermined mathematical function, the predetermined mathematical function generating a value for each possible backup edge device, each value representing a weighted combination of a possible backup device's inputted metrics; and
    identifying the preferred backup edge device based on the values generated by the predetermined mathematical function.

7. The method of claim 6, wherein the predetermined mathematic function is an objective polynomial function F(PE):

$$F(PE) = \sum_{i=1}^{N} w_i \cdot M_i(PE),$$

where $M_i(PE)$ is the value of the $i^{th}$ metric associated with a possible backup device PE and $w_i$ is a numerical weight assigned to the $i^{th}$ metric.

8. The method of claim 6, further comprising:
    identifying multiple preferred backup edge devices based on the values generated by the predetermined mathematical function; and
    load balancing rerouted network traffic among each of the multiple preferred backup edge devices.

9. The method of claim 6, further comprising:
    identifying multiple preferred backup edge devices based on the values generated by the predetermined mathematical function; and
    randomly selecting a preferred backup edge device from among the multiple preferred backup edge devices.

10. The method of claim 6, further comprising:
    identifying multiple preferred backup edge devices based on the values generated by the predetermined mathematical function; and
    selecting a preferred backup edge device based on the value of one or more selected metrics associated with the multiple preferred backup edge devices.

11. A method for performing fast reroute (FRR) operations at the edge of a computer network, the computer network having an edge device coupled to a neighboring routing domain, the method comprising:
    identifying a set of multiple possible backup edge devices for an address prefix;
    determining whether the address prefix is reachable to the edge device via an interior route;
    in response to determining that the address prefix is not reachable, determining that none of the address prefix's identified possible backup edge devices are to be used as a preferred backup edge device; and in response to determining that the address prefix is reachable, removing from the address prefix's identified set of possible backup edge devices any possible backup edge device that is not capable of functioning as a backup edge device, and associating one or more metrics with each of the address prefix's identified possible backup edge devices, detecting a loss of communication between the edge device and the neighboring routing domain, selecting the preferred backup edge device from the address prefix's identified set of possible backup edge devices based on the value of at least one of the metrics associated with the possible backup edge devices, receiving a data packet at the edge device, the received data packet containing a destination address matching the address prefix, and rerouting, in response to determining that the received data packet was not previously rerouted, the received data packet to the preferred backup edge device for forwarding to the neighboring routing domain.

12. The method of claim 11, further comprising:
determining the backup capability of a possible backup edge device based on the contents of an interior gateway protocol (IGP) advertisement or a Border Gateway Protocol (BGP) update message previously received at the edge device.

13. The method of claim 1, wherein at least one of the metrics is based on an interior gateway protocol (IGP) cost value associated with a possible backup edge device.

14. The method of claim 1, wherein at least one of the metrics is based on an inter-domain link bandwidth capacity associated with a possible backup edge device.

15. The method of claim 1, wherein at least one of the metrics is based on a link or node shared risk link group (SRLG) membership associated with a possible backup edge device.

16. The method of claim 1, wherein the step of identifying a possible backup edge device at the edge device further comprises:
receiving the address prefix from a device in the neighboring routing domain;
receiving the address prefix from another edge device in the computer network; and
identifying the other edge device in the computer network as a possible backup edge device for the address prefix.

17. The method of claim 1, wherein the step of identifying a possible backup edge device at the edge device further comprises:
statically configuring the address prefix's set of possible backup edge devices at the edge device.

18. A network node configured to perform fast reroute (FRR) operations at the edge of a computer network, the network node comprising:
a processor;
a first network interface adapted to receive an address prefix advertised by a device in a neighboring routing domain;
a second network interface adapted to receive a data packet containing a destination address matching the address prefix; and
a memory adapted to store instructions which are executable by the processor for performing the steps:
identifying a set of multiple possible backup edge devices for the address prefix;
associating one or more metrics with each of the address prefix's identified possible backup edge devices;
detecting a loss of communication over the first network interface;
selecting a preferred backup edge device from the address prefix's identified set of possible backup edge devices based on the value of at least one of the metrics associated with the possible backup edge devices;
determining whether the data packet received at the second network interface was previously rerouted in accordance with FRR operations; and
rerouting, in response to determining that the received data packet was not previously rerouted, the received data packet to the preferred backup edge device for forwarding to the neighboring routing domain.

19. The network node of claim 18, wherein the memory is further adapted to store instructions for:
performing a hierarchical selection process that inputs the metrics associated with each possible backup edge device into a sequence of selection criteria, each criterion in the sequence being applied to the metrics until the preferred backup edge device is identified by a criterion or the selection process is terminated.

20. The network node of claim 19, wherein the memory is further adapted to store instructions for:
(a) assigning a relative preference level for each type of metric associated with the possible backup edge devices;
(b) evaluating, for each possible backup edge device, a value of the metric having the greatest relative preference level;
(c) identifying the preferred backup edge device as the possible backup edge device having the greatest evaluated metric value;
(d) if multiple preferred backup edge devices are identified at step (c), then evaluating the next most-preferred metric for each of the identified preferred backup edge devices; and
(e) repeating steps (c) and (d) until a single preferred backup edge device is identified or every type of metric input to the hierarchical selection process has been evaluated.

21. The network node of claim 18, wherein the memory is further adapted to store instructions for:
performing a weighted-metric selection process that inputs the metrics associated with each possible backup edge device into a predetermined mathematical function, the predetermined mathematical function generating a value for each possible backup edge device, each value representing a weighted combination of a possible backup device's inputted metrics; and
identifying the preferred backup edge device based on the values generated by the predetermined mathematical function.

22. The network node of claim 21, wherein the predetermined mathematic function is an objective polynomial function F(PE):

$$F(PE) = \sum_{i=1}^{N} w_i \cdot M_i(PE),$$

where $M_i(PE)$ is the value of the $i^{th}$ metric associated with a possible backup device PE and $w_i$ is a numerical weight assigned to the $i^{th}$ metric.

23. A network node configured to perform fast reroute (FRR) operations at the edge of a computer network, the network node comprising:
- a processor;
- a first network interface configured to receive an address prefix advertised by a device in a neighboring routing domain;
- a second network interface configured to receive a data packet containing a destination address matching the address prefix; and
- a memory configured to store instructions which are executable by the processor for performing the steps:
- identifying a set of multiple possible backup edge devices for the address prefix;
- determining whether the address prefix is reachable to the network node via an interior route;
- in response to determining that the address prefix is not reachable, determining that none of the address prefix's identified possible backup edge devices are to be used as a preferred backup edge device; and
- in response to determining that the address prefix is reachable, removing from the address prefix's identified set of possible backup edge devices any possible backup edge device that is not capable of functioning as a backup edge device, and
- associating one or more metrics with each of the address prefix's identified possible backup edge devices,
- detecting a loss of communication over the first network interface,
- selecting the preferred backup edge device from the address prefix's identified set of possible backup edge devices based on the value of at least one of the metrics associated with the possible backup edge devices, and
- rerouting, in response to determining that the received data packet was not previously rerouted, the received data packet to the preferred backup edge device for forwarding to the neighboring routing domain.

24. A network node configured to perform fast reroute (FRR) operations at the edge of a computer network, the network node being coupled to a neighboring routing domain, the network node comprising:
- means for identifying a set of multiple possible backup edge devices for an address prefix advertised by a device in the neighboring routing domain;
- means for associating one or more metrics with each of the address prefix's identified possible backup edge devices;
- means for detecting a loss of communication with the neighboring routing domain;
- means for selecting a preferred backup edge device from the address prefix's identified set of possible backup edge devices based on the value of at least one of the metrics associated with the possible backup edge devices;
- means for receiving a data packet containing a destination address matching the address prefix;
- means for determining whether the received data packet was previously rerouted in accordance with FRR operations; and
- means for rerouting, in response to determining that the received data packet was not previously rerouted, the received data packet to the preferred backup edge device for forwarding to the neighboring routing domain.

25. The network node of claim 24, wherein the means for selecting the preferred backup edge device further comprises:
- means for performing a hierarchical selection process that inputs the metrics associated with each possible backup edge device into a sequence of selection criteria, each criterion in the sequence being applied to the metrics until the preferred backup edge device is identified by a criterion or the selection process is terminated.

26. The network node of claim 25, further comprising:
- means for assigning a relative preference level for each type of metric associated with the possible backup edge devices;
- means for evaluating, for each possible backup edge device, a value of the metric having the greatest relative preference level;
- means for identifying the preferred backup edge device as the possible backup edge device having the greatest evaluated metric value; and
- means for evaluating the next most-preferred metric for each of the identified preferred backup edge devices if multiple preferred backup edge devices are identified by the means for identifying the preferred backup edge device.

27. The network node of claim 24, wherein the means for selecting the preferred backup edge device further comprises:
- means for performing a weighted-metric selection process that inputs the metrics associated with each possible backup edge device into a predetermined mathematical function, the predetermined mathematical function generating a value for each possible backup edge device, each value representing a weighted combination of a possible backup device's inputted metrics; and
- means for identifying the preferred backup edge device based on the values generated by the predetermined mathematical function.

28. The network node of claim 27, wherein the predetermined mathematic function is an objective polynomial function F(PE):

$$F(PE) = \sum_{i=1}^{N} w_i \cdot M_i(PE),$$

where $M_i(PE)$ is the value of the $i^{th}$ metric associated with a possible backup device PE and $w_i$ is a numerical weight assigned to the $i^{th}$ metric.

29. A network node configured to perform fast reroute (FRR) operations at the edge of a computer network, the network node being coupled to a neighboring routing domain, the network node comprising:
- means for identifying a set of multiple possible backup edge devices for an address prefix advertised by a device in the neighboring routing domain;
- means for determining whether the address prefix is reachable to the network node via an interior route;
- means for determining, in response to determining that the address prefix is not reachable, that none of the address prefix's identified possible backup edge devices are to be used as a preferred backup edge device;
- means for removing, in response to determining that the address prefix is reachable, from the address prefix's identified set of possible backup edge devices any possible backup edge device that is not capable of functioning as a backup edge device;
- means for associating one or more metrics with each of the address prefix's identified possible backup edge devices;
- means for detecting a loss of communication with the neighboring routing domain;

means for selecting the preferred backup edge device from the address prefix's identified set of possible backup edge devices based on the value of at least one of the metrics associated with the possible backup edge devices;

means for receiving a data packet containing a destination address matching the address prefix; and means for rerouting, in response to determining that the received data packet was not previously rerouted, the received data packet to the preferred backup edge device for forwarding to the neighboring routing domain.

30. A computer network, comprising:

a first edge device coupled to a neighboring routing domain; and a second edge device coupled to the neighboring routing domain, the second edge device being configured to:

identify a set of multiple possible backup edge devices for an address prefix advertised by a device in the neighboring routing domain, the first edge device being identified as one of the possible backup edge devices for the address prefix;

associate one or more metrics with each of the address prefix's identified possible backup edge devices;

detect a loss of communication with the neighboring routing domain;

select the first edge device as a preferred backup edge device from among the address prefix's identified set of possible backup edge devices based on the value of at least one of the metrics associated with the possible backup edge devices;

receive a data packet containing a destination address matching the address prefix;

determine whether the received data packet was previously rerouted in accordance with FRR operations; and reroute, in response to determining that the received data packet was not previously rerouted, the received data packet to the first edge device for forwarding to the neighboring routing domain.

31. The computer network of claim 30, wherein the second edge device is further configured to:

perform a hierarchical selection process that inputs the metrics associated with each possible backup edge device into a sequence of selection criteria, each criterion in the sequence being applied to the metrics until a criterion identifies the first edge device as the preferred backup edge device.

32. The computer network of claim 30, wherein the second edge device is further configured to:

perform a weighted-metric selection process that inputs the metrics associated with each possible backup edge device into a predetermined mathematical function, the predetermined mathematical function generating a value for each possible backup edge device, each value representing a weighted combination of a possible backup device's inputted metrics; and identifying the first edge device as the preferred backup edge device based on the values generated by the predetermined mathematical function.

33. A computer-readable medium storing instructions for execution on a processor for the practice of a method of performing fast reroute (FRR) operations at the edge of a computer network, the network having an edge device coupled to a neighboring routing domain, the method comprising:

identifying a set of multiple possible backup edge devices for an address prefix advertised by a device in the neighboring routing domain;

associating one or more metrics with each of the address prefix's identified possible backup edge devices;

detecting a loss of communication between the edge device and the neighboring routing domain;

selecting a preferred backup edge device from the address prefix's identified set of possible backup edge devices based on the value of at least one of the metrics associated with the possible backup edge devices;

receiving a data packet at the edge device, the received data packet containing a destination address matching the address prefix;

determining whether the received data packet was previously rerouted in accordance with FRR operations; and rerouting, in response to determining that the received data packet was not previously rerouted, the received data packet to the preferred backup edge device for forwarding to the neighboring routing domain.

* * * * *

UNITED STATES PATENT AND TRADEMARK OFFICE
CERTIFICATE OF CORRECTION

PATENT NO. : 7,535,828 B2
APPLICATION NO. : 11/084838
DATED : May 19, 2009
INVENTOR(S) : Clarence Filsfils It is certified that error appears in the above-identified patent and that said Letters Patent is hereby corrected as shown below:

Col. 1, Line 6, please replace "FAST REROUTE (FUR)" with "FAST REROUTE (FRR)"

Signed and Sealed this
Twenty-second Day of March, 2011

David J. Kappos
*Director of the United States Patent and Trademark Office*